(12) United States Patent
Greeb et al.

(10) Patent No.: US 6,953,084 B2
(45) Date of Patent: Oct. 11, 2005

(54) ACTUATOR FOR WELL-HEAD VALVE OR OTHER SIMILAR APPLICATIONS AND SYSTEM INCORPORATING SAME

(75) Inventors: Kevin E. Greeb, Fort Collins, CO (US); Jeffrey T. Stewart, Greeley, CO (US); Grant A. Sweer, Fort Collins, CO (US); Joel W. Kleckler, Rockton, IL (US); Roger T. Hybeck, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 46 days.

(21) Appl. No.: 10/340,017

(22) Filed: Jan. 10, 2003

(65) Prior Publication Data

US 2004/0134665 A1 Jul. 15, 2004

(51) Int. Cl.$^7$ .............................................. E21B 34/02
(52) U.S. Cl. .................... 166/66.4; 166/66.7; 166/97.1; 166/332.1
(58) Field of Search .............................. 166/65.1, 66.4, 166/66.6, 66.7, 75.13, 97.1, 316, 332.1

(56) References Cited

U.S. PATENT DOCUMENTS

| | | | |
|---|---|---|---|
| 3,830,306 A | 8/1974 | Brown | 166/53 |
| 4,616,528 A | * 10/1986 | Malinski et al. | 475/4 |
| 5,519,295 A | 5/1996 | Jatnieks | 318/453 |
| 6,161,835 A | 12/2000 | Arbuckle | 277/320 |
| 6,431,317 B1 | 8/2002 | Coe | 185/40 R |

OTHER PUBLICATIONS

LIMITORQUE, *L 120 Series Multi–turn Electric Valve Actuators for a Wide Range of Process Applications*, Copyright 1999; 19, pages, Printed in U.S.A.

FISHER–ROSEMOUNT, *easy–e® Globe–Style Control Valves*, Product Flier PF51.1:E, Oct., 1998, 28 pages, Printed in U.S.A.

Shafer Valve Company, *L–Series Linear Valve Actuators*, Bulletin L–01293, 4 pages, undated.

TYCO, *Valves, Actuators and Controls*, 16 pages, Printed in U.S.A., undated.

Jordan Controls, *VA–1000 Series Linear Valve Actuators*, 9 pages, (pp. 89–98), undated.

Jordan Controls, *MV–1100/MV–1500 Series Linear Valve Actuators*, 6 pages, (pp. 93–98), undated.

Metso Automation, *Valvcon Back–up Powered Electric Actuators MSB, ADC and ESR Series*, Catalog, 11 pages, undated.

Emerson Process Management, *Bettis TorqPlus Electric Valve Actuators and Controls*, Catalog, 32 pages, 2002.

* cited by examiner

Primary Examiner—Zakiya Walker
(74) Attorney, Agent, or Firm—Reinhart Boerner Van Deuren P.C.

(57) ABSTRACT

An electrical actuator is particularly suited for driving a wellhead valve for regulating the flow of natural gas from a production well. The electrical actuator can be driven using the existing local power supply in wellhead valve systems, typically a solar panel and a battery. The electrical actuator may include a gear reduction train, a brake and a manual input override with clutch protection. The electrical actuator can be configured in three different operational modes that provides a predetermined position upon power loss including fail-bias fixed, fail open and fail bias closed.

17 Claims, 21 Drawing Sheets

ACTUATOR FOR WELL-HEAD VALVE OR OTHER SIMILAR APPLICATIONS AND SYSTEM INCORPORATING SAME

FIELD OF THE INVENTION

This invention pertains to regulating valves, and more particularly to regulating valves that operate under high loads at remote locations where a commercial supply of electricity may not be readily available, such as regulating valves for well-heads that regulate flow of natural gas or other process fluid out of a ground well.

BACKGROUND OF THE INVENTION

In the commercial natural gas production industry, a network of gas collection pipes often will connect and branch together tens to hundreds of natural gas ground wells in a localized geographic region. The individual wells will feed natural gas through the network of gas collection pipes to a common output location. The wells may be owned by several different land owners and/or mineral rights owners who may sell their natural gas production to a commercial supplier of natural gas. The commercial supplier will typically purchase natural gas from the land or rights owners based upon its needs. This provides a need for regulating and monitoring natural gas production from each well. Even if the commercial purchaser of natural gas owns the land or the mineral rights, it will still want to monitor and/or regulate the production of each well to control its supply. Often, the desired natural gas output is less than the maximum production capacity of the several wells combined. Such demands can change due to cyclical seasonal trends and for other economic reasons.

To regulate the production output of each individual well, the branch collection pipe for each individual well typically has a flow regulating valve and a gas flow sensor arranged in fluid series. The gas flow sensor indicates the amount of natural gas that flows through the collection pipe. The regulating control valve provides a variable degree of opening that forms a restriction orifice in the collection pipe and thereby sets the natural gas flow rate in the collection pipe.

By virtue of where natural gas deposits are geographically located, groups of natural gas production wells are often located in remote areas where there is no commercial supply of electricity. Such wells may also be distant or not readily accessible from civilization. As a result, achieving automatic control and actuation of gas regulating valves has not had straightforward solutions. Fluid pressure in natural gas production wells can be as high as about 900 psi or in some instances higher and as low as about 10 psi. This requires or necessitates an actuating means that has a high actuating force as wellhead regulating valves may therefore have hundreds of pounds of force exerted upon them. The ready answer in the prior art has been to use a small portion of the process gas (such as the natural gas) as working fluid to power a combination of pneumatic regulator/actuator components including a pneumatic actuator, I/P regulator, pressure reducing regulators and a positioner, that are arranged in an operational fluid network for positioning the regulating well-head valve, as shown schematically in FIG. 22 which depicts the typical wellhead production well system currently employed. In this arrangement, working fluid flow must be controlled. A solar panel and battery (which are kept as small as possible for costs reasons) are frequently employed to provide a small electrical local power source to power a motor operated regulator that electrical controls working fluid flow. This provides for electrical control over the pneumatic actuator.

Although pneumatic actuation has proven to work, there have long been several significant drawbacks using pneumatic actuation such as shown in FIG. 21. In particular, pneumatic actuating systems of the prior art (including many of the individual regulator and actuator components) both consume and exhaust natural gas, meaning that natural gas is therefore released gas into the atmosphere when the regulating valve is repositioned or otherwise controlled. Because of the discharge of gas, these systems may pose difficulties in meeting strict environmental regulations relating to fugitive natural gas emissions. Further, there is a significant safety hazard with fugitive natural gas emissions. An electrical spark whether produced by lighting, other adjacent equipment or components (including control electronics), or by maintenance personnel or their equipment when working on the gas network (which maybe increased when safety precautions are not followed), can potentially ignite the releases of natural gas and cause a potentially explosive situation.

In view of the foregoing, there has long been a need to provide a practical and economically feasible solution to reduce and if possible eliminate the hazards and other disadvantages associated with fugitive natural gas emissions that occur when controlling regulating valves for wellheads.

BRIEF SUMMARY OF THE INVENTION

One aspect of the present invention is directed toward system for regulating flow of process fluid from a well using electrical actuation to drive a wellhead valve. The system includes a collection pipe for collecting process fluid from the well, a flow sensor sensing flow of process fluid through the collection pipe, a local electrical power source, and a well head valve in series with the flow sensor for regulating the flow of process fluid through the collection pipe. Electrical actuation is accomplished with a gear reduction train and an electrical motor. The gear reduction train comprises a plurality of gears for reducing actuating force needed to move the well head valve. The electrical motor is powered by the local electrical power source and drives the well head valve through the gear reduction train.

It is an advantage of the present invention the well head valve can be positioned between all positions without utilizing and releasing process gas for actuation of the well head valve. Further, the existing local electrical supply which typically comprises a battery and a solar panel may be used to power the electrically actuated wellhead valve.

Another aspect of the present invention is directed toward a novel method for controlling position of a well head valve to control flow of process gas from the well using a local electrical power source. The method comprises electrically actuating the well head valve with an electrical actuation force to regulate the flow of process gas without releasing process gas, powering the electrical actuation using the local electrical power source, and amplifying the electrical actuation force and thereby reducing the speed of the electrical actuation, in which this amplification is sufficient such that the electrical actuation is accomplished using only the local electrical power source.

Yet another aspect of the present invention is directed toward a method of retrofitting a wellhead valve to reduce emissions of process gas from a well. The method comprises removing a pneumatic actuator (and its working fluid regulating components) that utilizes and exhausts process gas to position a wellhead valve in which the pneumatic actuator is electrically controlled using a local electrical power source. The pneumatic actuator is then replaced with an electrical actuator mechanism having an electrical motor and a gear reduction train. The electrical actuator mechanism drives the wellhead valve through the gear reduction train without releasing process gas for the actuation force. The method further includes powering the electrical motor with the local electrical power source with the gear reduction train being provided with a large enough reduction ratio such that the local electrical power source is sufficient for the electrical motor to drive the wellhead valve through the gear reduction train despite process fluid pressure and/or spring force being exerted upon the wellhead valve. The wellhead valve may or may not be replaced at the same time.

Another aspect of the present invention is directed at a novel arrangement of an electrical actuator. The actuator comprises an electrical motor adapted to rotate an output shaft and a gear reduction train comprising a plurality of gears including an input gear on the output shaft and a rotary output. The gears are adapted to amplify force from the input gear to the rotary output when the electrical motor rotates the output shaft. The electrical actuator further comprises a manual override input acting upon the gear reduction train such that the gear reduction train can be manually driven, and brake having an on position in which the brake is adapted to prevent backdriving of the gear reduction train.

According to this aspect, a spring may be arranged to urge the gear reduction train in a predetermined direction. When the brake is in the on position, it provides sufficient resistance to hold a current position of the gear reduction train against the action of the spring. The electrical motor has a sufficient rotary output force to overcome resistance of the brake when in the on position to drive the gear reduction train.

A further feature of the present invention is that the electrical actuator is configurable between three different possible modes of operation. Configuration in three different possible modes is accomplished by having a biasing force of the spring that is manually reversible and a brake that also has an off position such that the spring can drive the gear reduction train. The electrical actuator then has three different configurable operational modes upon power loss to the electrical motor, including a first fail-bias mode wherein the spring is arranged to urge the gear reduction train in a first direction to a first limit upon power loss with the brake in the off position, a second fail-bias mode wherein the spring is arranged to urge the gear reduction train in an opposite direction to a second limit upon power loss with the brake in the off position, and a fail-fix mode wherein the brake is in the on position and holds the current position of the gear reduction train.

The electrically actuator may be mounted or mountable to a valve to provide an electrically actuated valve package.

Other advantages of the invention, as well as additional inventive features, will be apparent from the description of the invention provided herein.

DETAILED DESCRIPTION OF THE INVENTION

Figure 1:
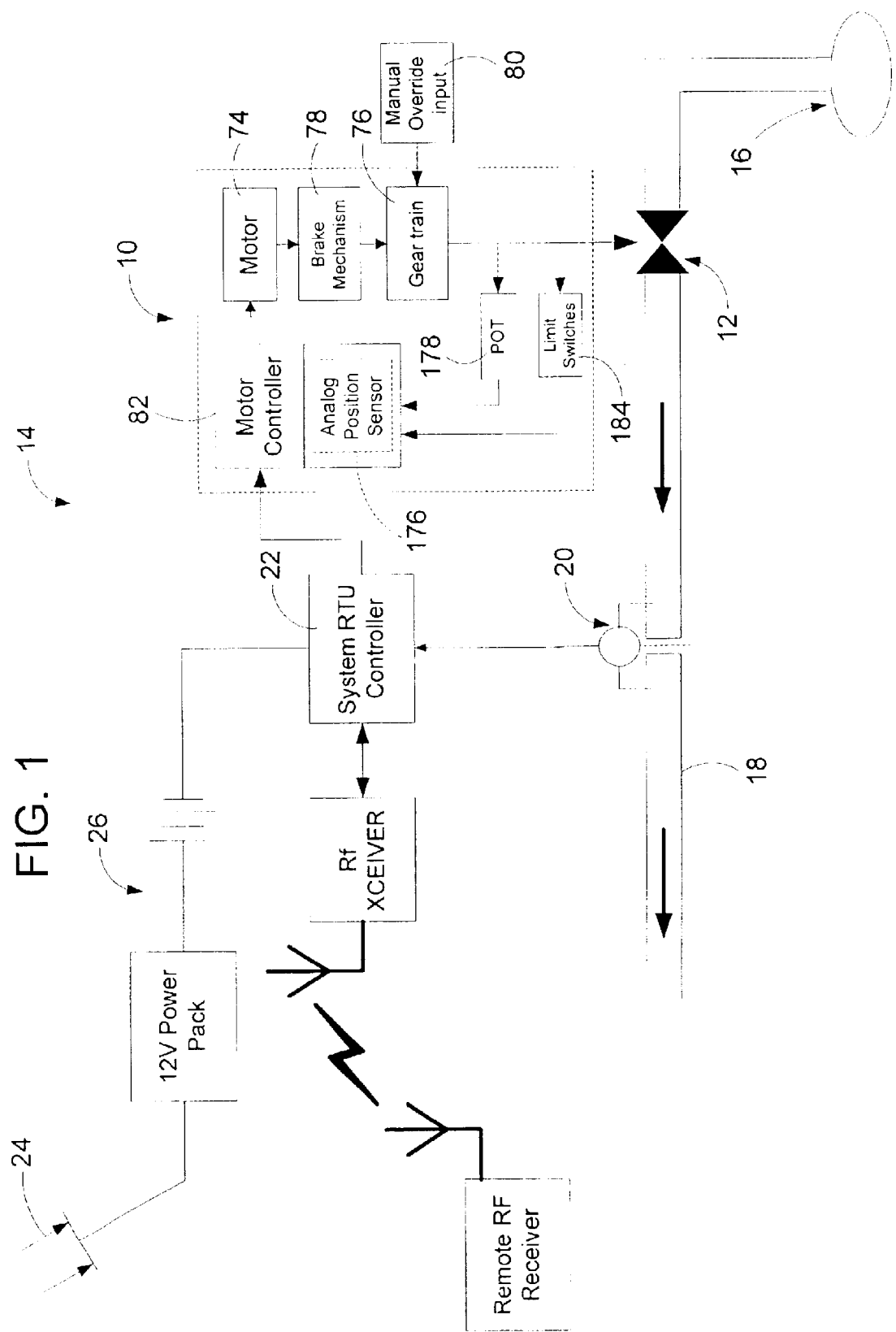
FIG. 1 is a schematic plan view of a wellhead system incorporating the electrically actuated valve according to a preferred embodiment of the present invention.
Figure 2:
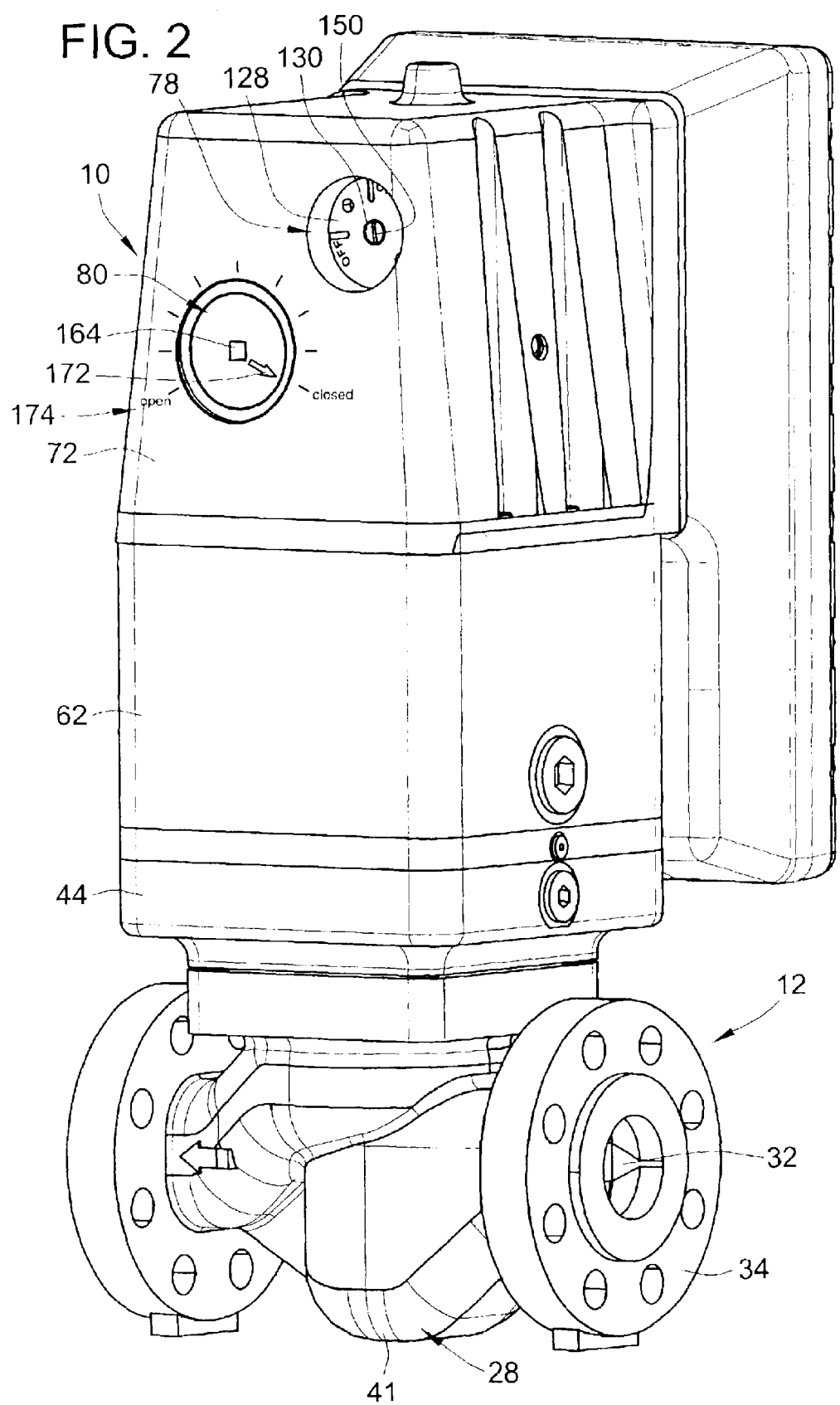
FIG. 2 is an isometric view of the electrically actuated valve shown in FIG. 1.

An electrical actuator 10 that is particularly suited for a well-head valve 12 is shown throughout the figures in accordance with a preferred embodiment of the present invention. FIG. 1 illustrates a natural gas well production system 14 which is an exemplary application and operational environment for the electrical actuator 10. As shown in FIG. 1, the well-head valve 12 regulates the production output of a natural gas production well 16 through a collection pipe 18. The well head valve 12 is mounted in the collection pipe 18 in fluid series with a gas flow sensor 20. The degree of opening of the well head valve 12 and the natural gas pressure of the well 16 (which typically ranges between about 10–900 psi or even higher for most production wells) determine the natural gas flow rate through the collection pipe 18. The gas flow sensor 20 measures the amount of natural gas that flows through the pipe 18. The gas flow sensor 20 provides electrical feedback representative of the sensed flow rate to an electronic controller 22 for closed loop control over the electrical actuator 10 and well-head valve 12.

Since the well 16 may be located remote from a commercially available electrical power supply, the system 14 is shown to include a local electrical power supply which typically comprises a small solar panel 24 and battery 26. The solar panel 24 generates a small electrical power supply and the battery 26 stores the electrical power supply. Advantageously, the electrical actuator 10 can replace pneumatic actuation systems without needing any additional power or electrical generation, using only the existing local electrical power supply if desired. As such, additional cost need not be wasted on electrical generation, and the present invention may be employed as a retrofit device to replace pneumatic actuating systems at existing well-head valves. However, it should be noted that in some instances that some additional expansion of the electrical generation or storage capabilities may be desirable.

In FIG. 1, two separate controllers 22, 82 are indicated, but these may be integrated if desired into a single controller assembly. To provide for both retrofit and new systems, typically two separate controllers 22, 82 will be used.

The well-head valve 12 may be a linearly translatable valve, a rotary valve or other movable/positionable valve. Referring to FIGS. 2–4 and 8, the illustrated well-head valve 12 is shown as the linear type comprising a valve housing 28 and linearly translatable valve member 20. The valve housing 28 includes a valve body 41 defining a flow passage 32. The flow passage 32 extends between and through a pair mounting flanges 32 on ends of the valve body 41. The mounting flanges 32 are adapted to mount the wellhead valve 12 on a collection pipe 18. The valve member 20 may include separate components including a plug member 36 and an elongate valve stem 38 extending from the plug member 38, as is shown. The valve stem 38 extends through the valve housing 20 and is acted upon by the electrical actuator 10. The valve stem 38 transmits the selective positioning force from the electrical actuator 10 to the plug member 36. The plug member 36 is situated in cage 42 along the flow passage 32 to provide a restriction orifice that regulates flow through the valve. The plug member 36 is linearly translatable toward and away from a valve seat 40 between fully closed and fully open positions, and intermediate positions therebetween. The plug member 36 blocks all flow when in the fully closed position and allows for maximum flow when in the fully open position.

To provide for installation of the movable valve member 20, the valve housing 38 may be composed of multiple pieces including the valve body 41, a metering cage 42 which radially restrains and guides movement of the valve plug member 36 and a bonnet 44 which radially restrains and provides for a seal arrangement 46. The seal arrangement 46 provides a static seal and dynamic seal that prevents leakage of natural gas from the valve 12. One suitable seal arrangement for preventing natural gas leakage in the valve is illustrated in U.S. Pat. No. 6,161,835 to Don Arbuckle, the entire disclosure of which is incorporated by reference.

Figure 9:
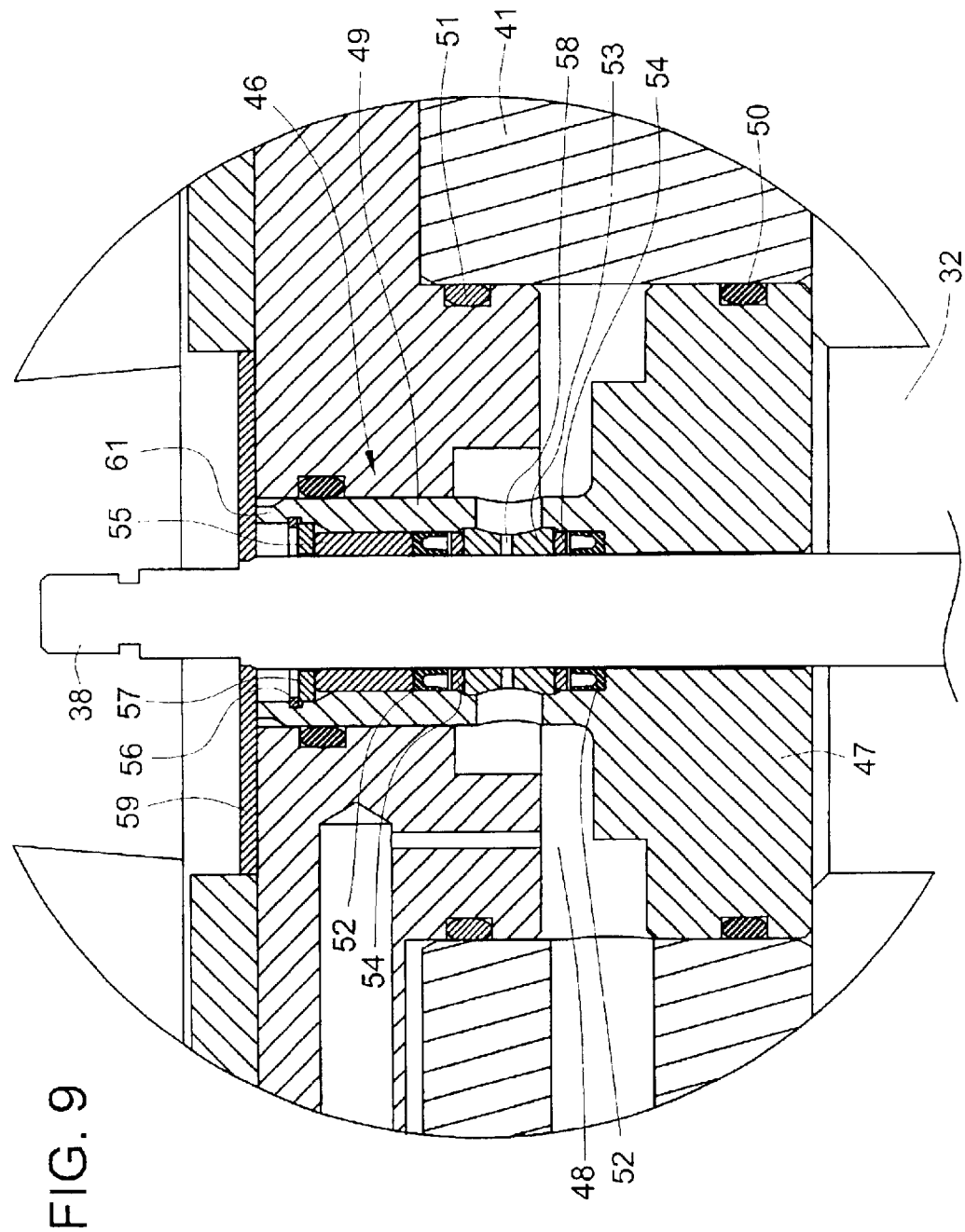
FIG. 9 is an enlarged cross section of FIG. 8 illustrating a sealing arrangement for the valve.
Figure 10:
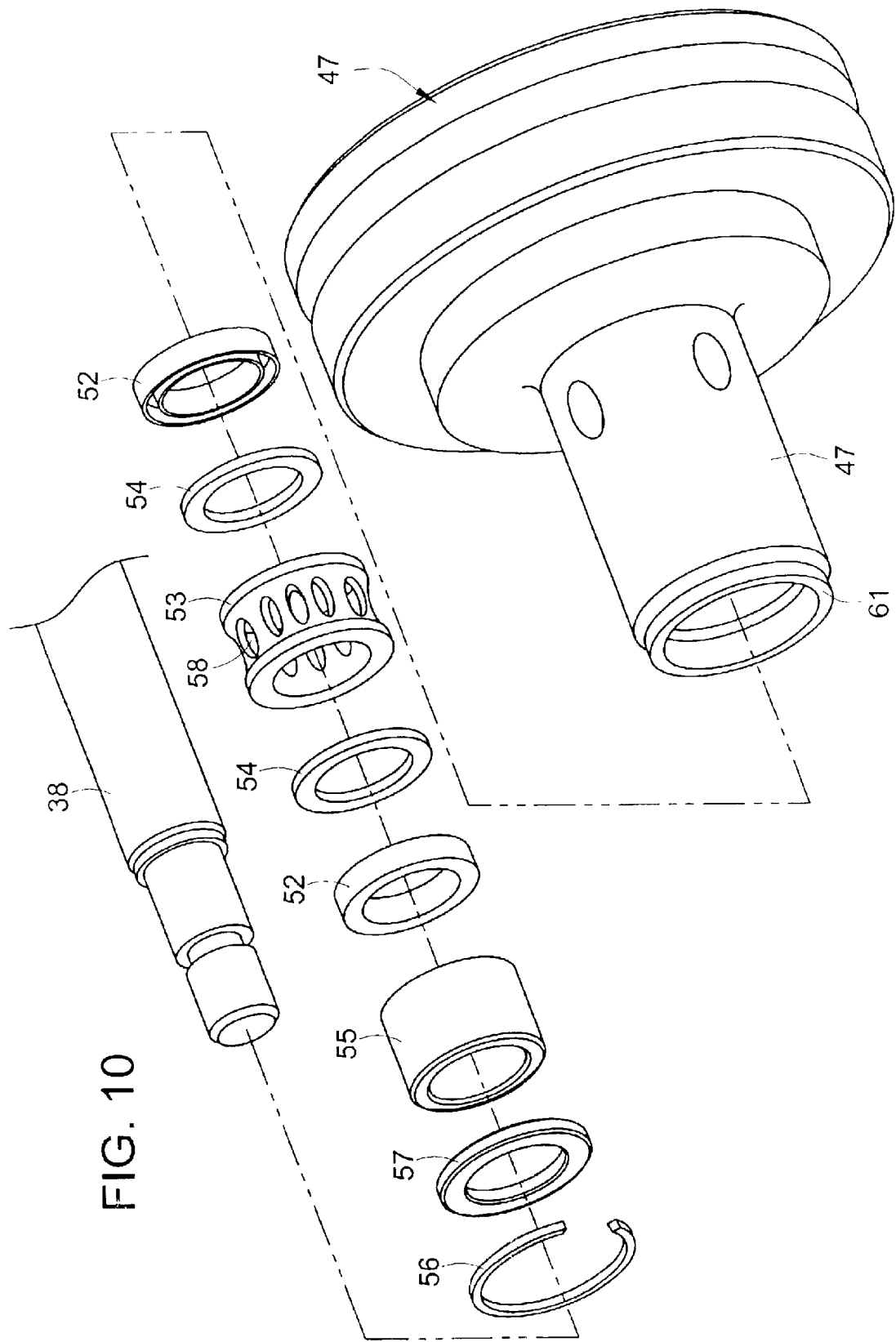
FIG. 10 is an exploded assembly view of the sealing arrangement shown in FIG. 9.
Figure 11:
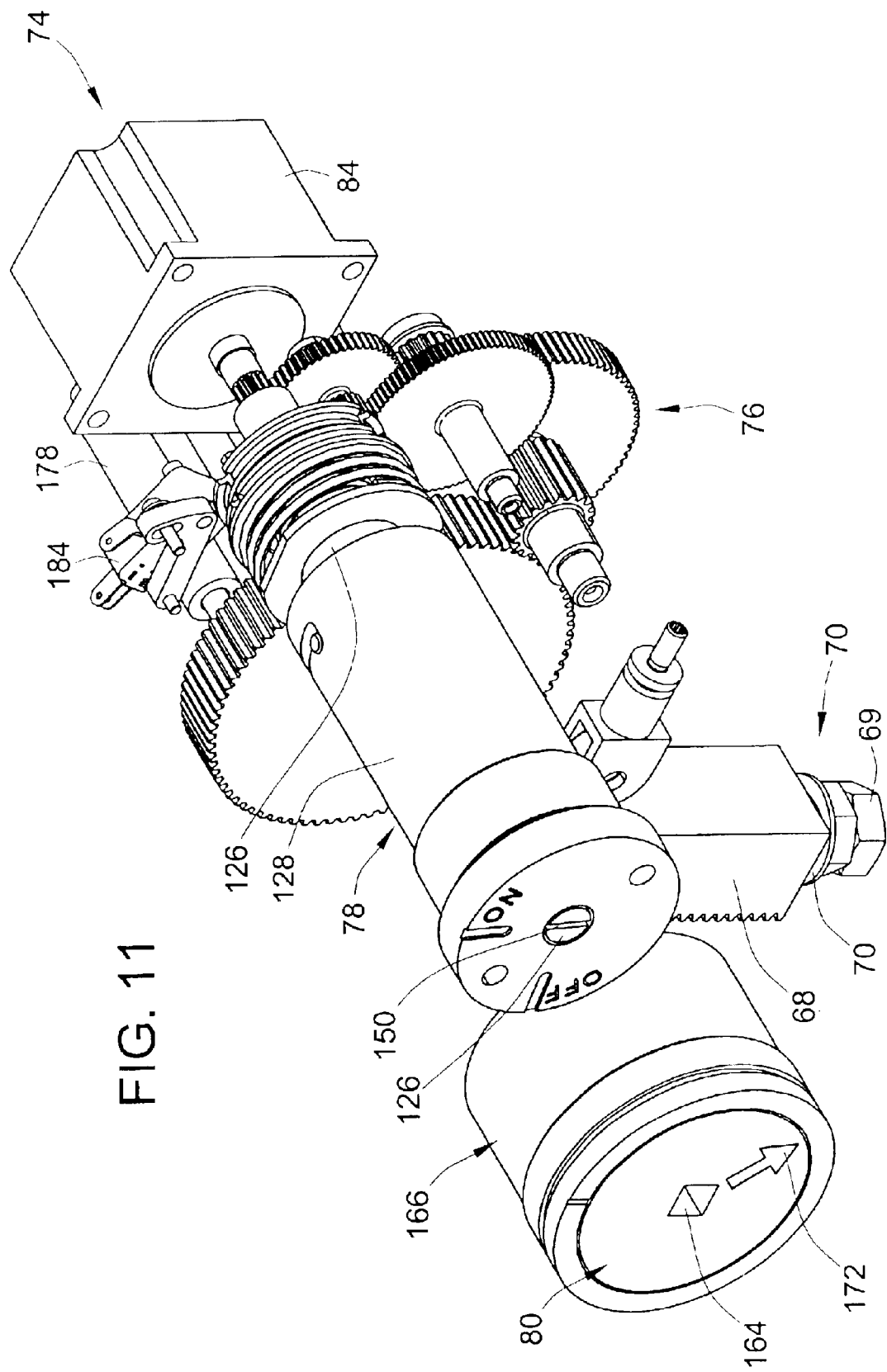
FIG. 11 is an isometric view of the guts of the electrical actuator shown in previous figures.
Figure 12:
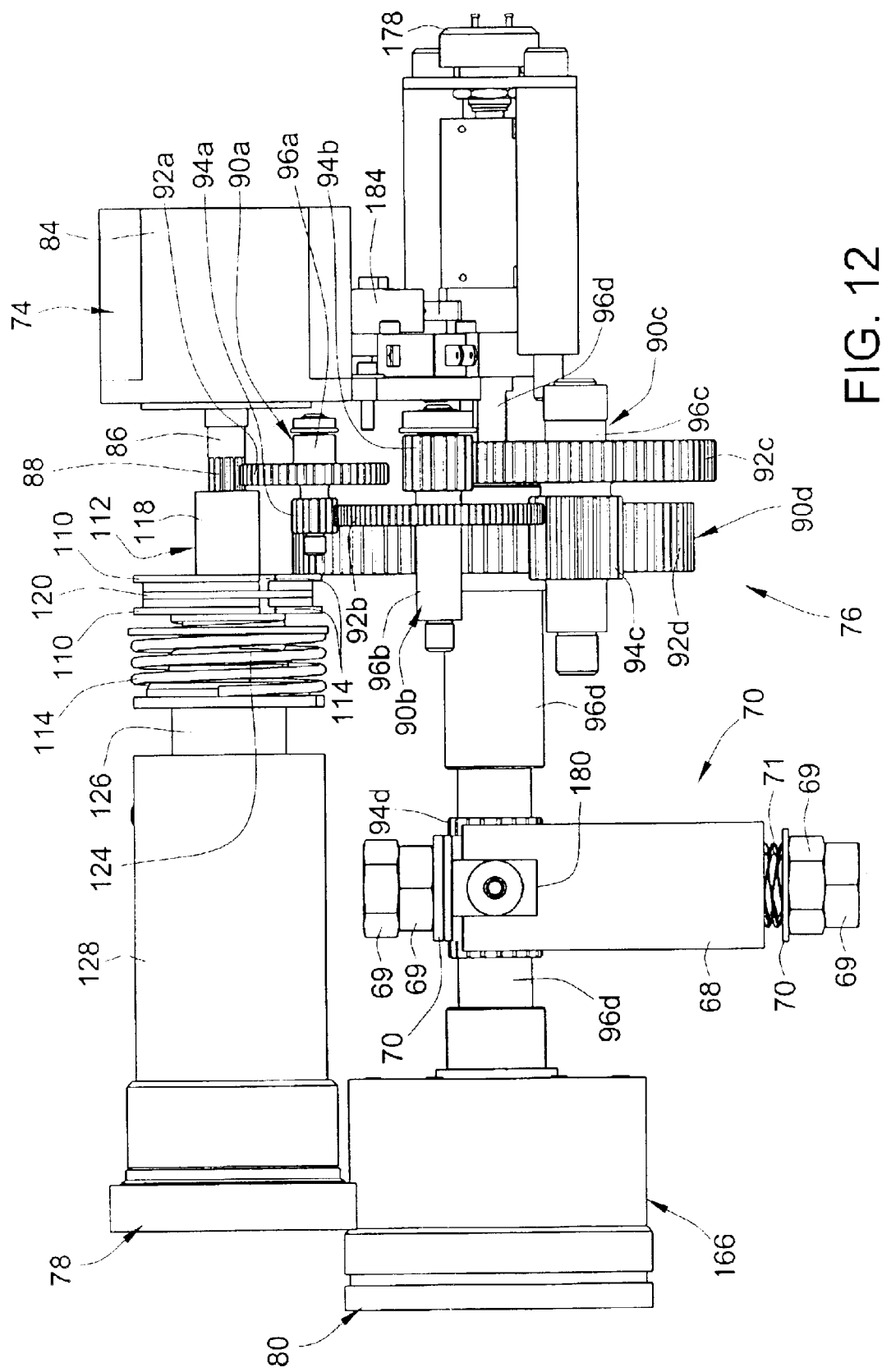
FIG. 12 is a side view of the guts of the electrical actuator shown in previous figures.
Figure 13:
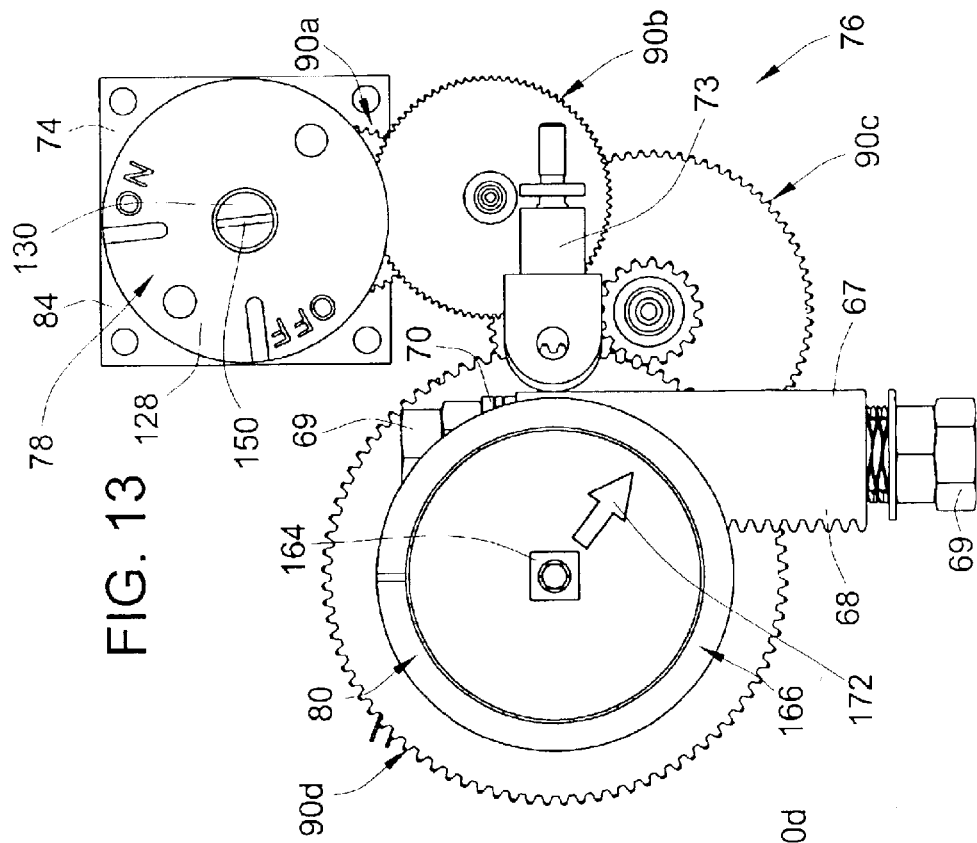
FIGS. 13–14 are frontal and back views of the guts of the electrical actuator shown in previous figures.
Figure 14:
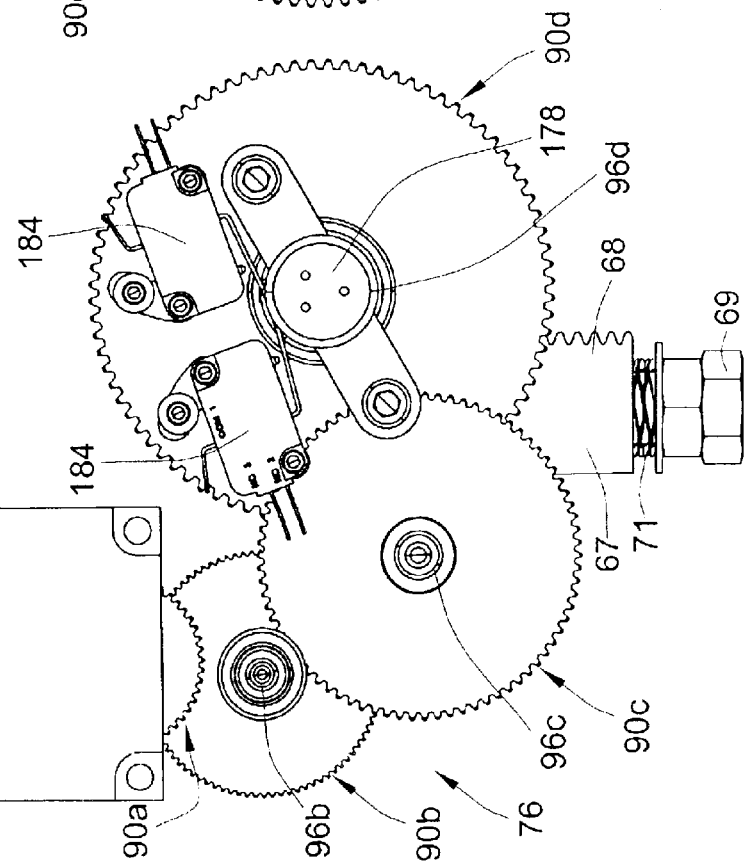
Figure 17:
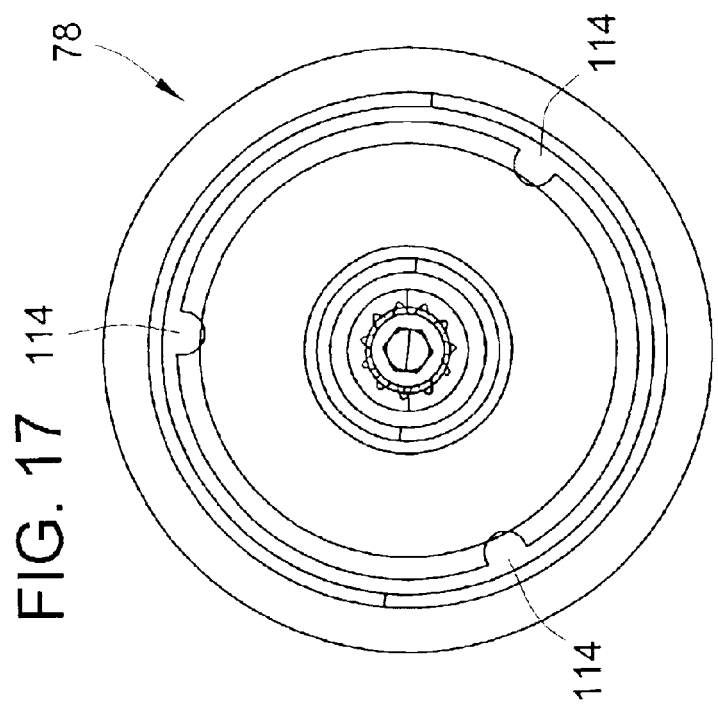
FIGS. 15 and 17 are front and rear end views of the brake mechanism used in the electrical actuator shown in previous figures.

However, the disclosed embodiment includes a more advantageous and novel seal arrangement 46 that is less complicated, less expensive and more reliable. Referring to FIGS. 9–10, the sealing arrangement 46 includes a pressuring annular piston 47 extending through and surrounding the valve stem 38. One face of the piston 47 is acted upon by process fluid contained in the valve flow passage 32 to pressurize seal lubricant fluid that is contained in a sealant cavity 48. The piston 47 includes a sleeve portion 49 that contains a seal packing. The outer periphery of the piston 47 carries an o-ring seal 50 for preventing communication between process fluid and lubricant. Not much, if any, piston movement is anticipated where the o-ring seal 50 is located, and therefore this may be considered a static seal for all practical purposes. Another static o-ring seal 51 is located between the valve body 41 and the bonnet 44 for preventing leakage from the sealant cavity 48. Thus, the two O-ring seals 50, 51 are arranged in series and provide redundant backup to ensure process fluid does not leak through the sealant cavity.

The seal packing contained in the piston sleeve portion 49 includes a pair of dynamic O-ring seals 52 arranged in fluidic series, a spacer element 53, a pair of seal retainer washers 54, a PTFE guide bushing 55, a snap ring 56 and a retaining washer 57. The snap ring 56 snaps into a groove in the piston sleeve portion 49 to axially retain the seal packing in place. The PTFE guide bushing 55 is tightly fit around the valve stem 38 to provide for low friction sliding movement of the valve member 30. The spacer element 53 axially spaces the O-ring seals 52 with the seal retainer washers 54 providing for balance and retention of the seals 52. Ports 58 extend through the spacer element 53 such that a pressurized cylindrical ring of lubricant surrounds the valve stem 38 between the seals 52 such that the lubricant acts upon each of the dynamic seals 52.

A cover 59 is provided that encloses the packing and piston to prevent dust and other external contaminants from damaging the sealing arrangement 46. The cover 59 can be removed to manually check the level of lubricant which is indicative of how well the seals 50, 51, 52 are working. Specifically, the end of the piston sleeve portion acts as an sealant level indicator 61. When the sleeve end or indicator 61 is flush or coplanar with the top surface of the bonnet 44, the proper amount of sealant lubricant is contained in the sealant cavity 48. If the indicator is raised above the top surface by virtue of axial piston movement, that is indicative that sealant has leaked out. A partitioned scale may be provided along the outer surface of the piston sleeve portion 49 to provide a numerical indication of lubricant level if desired. Several advantages are provided with this seal arrangement 46, including easier manufacture and assembly, prevention of contaminants from reaching the sealing arrangement and an integral mechanism to indicate the seal lubricant level.

Figure 3:
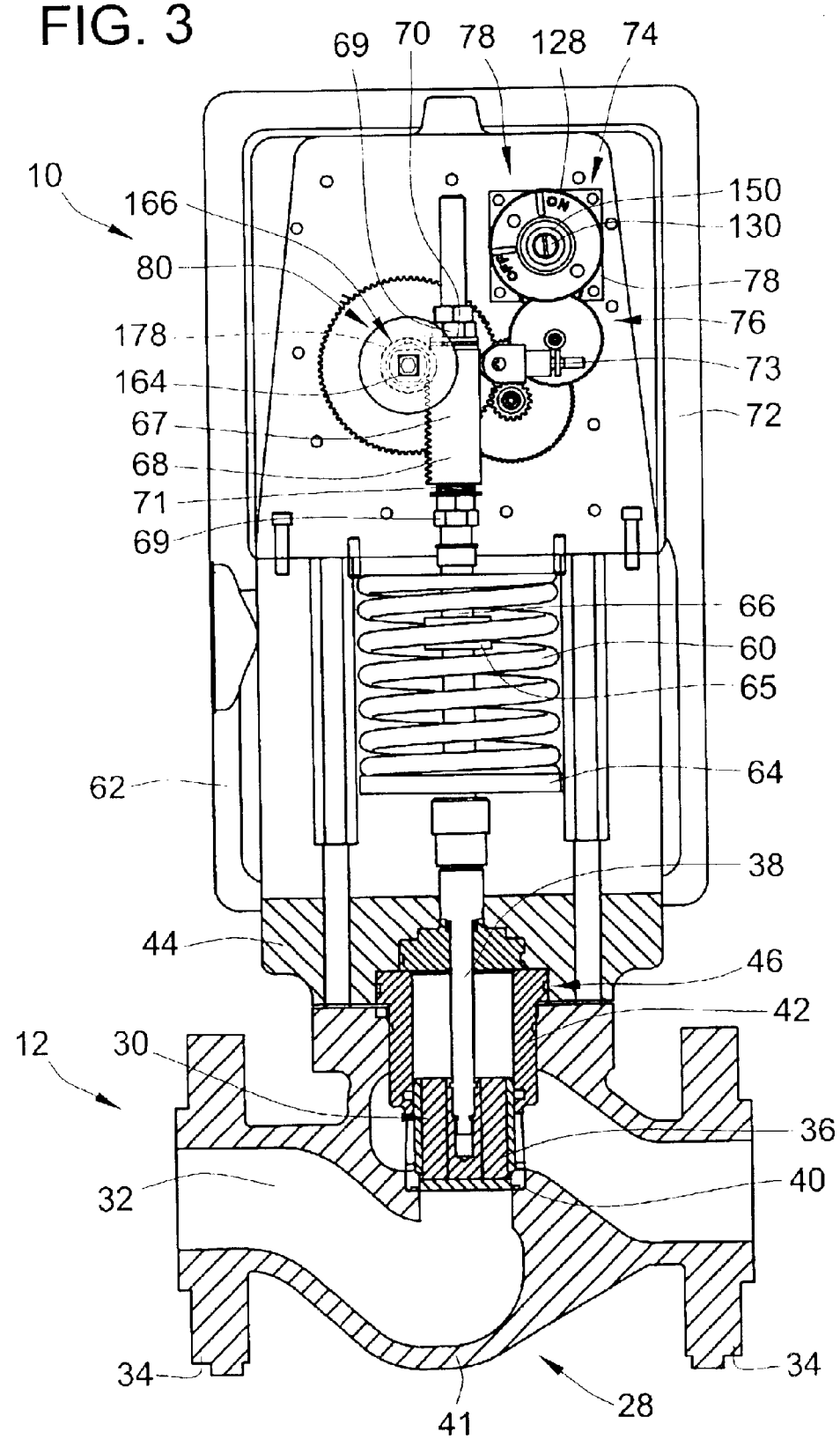
FIGS. 3–4 are cross sections of the electrically actuated valve shown in FIG. 2 with the cross sectional views being shown from the front and the side.
Figure 4:
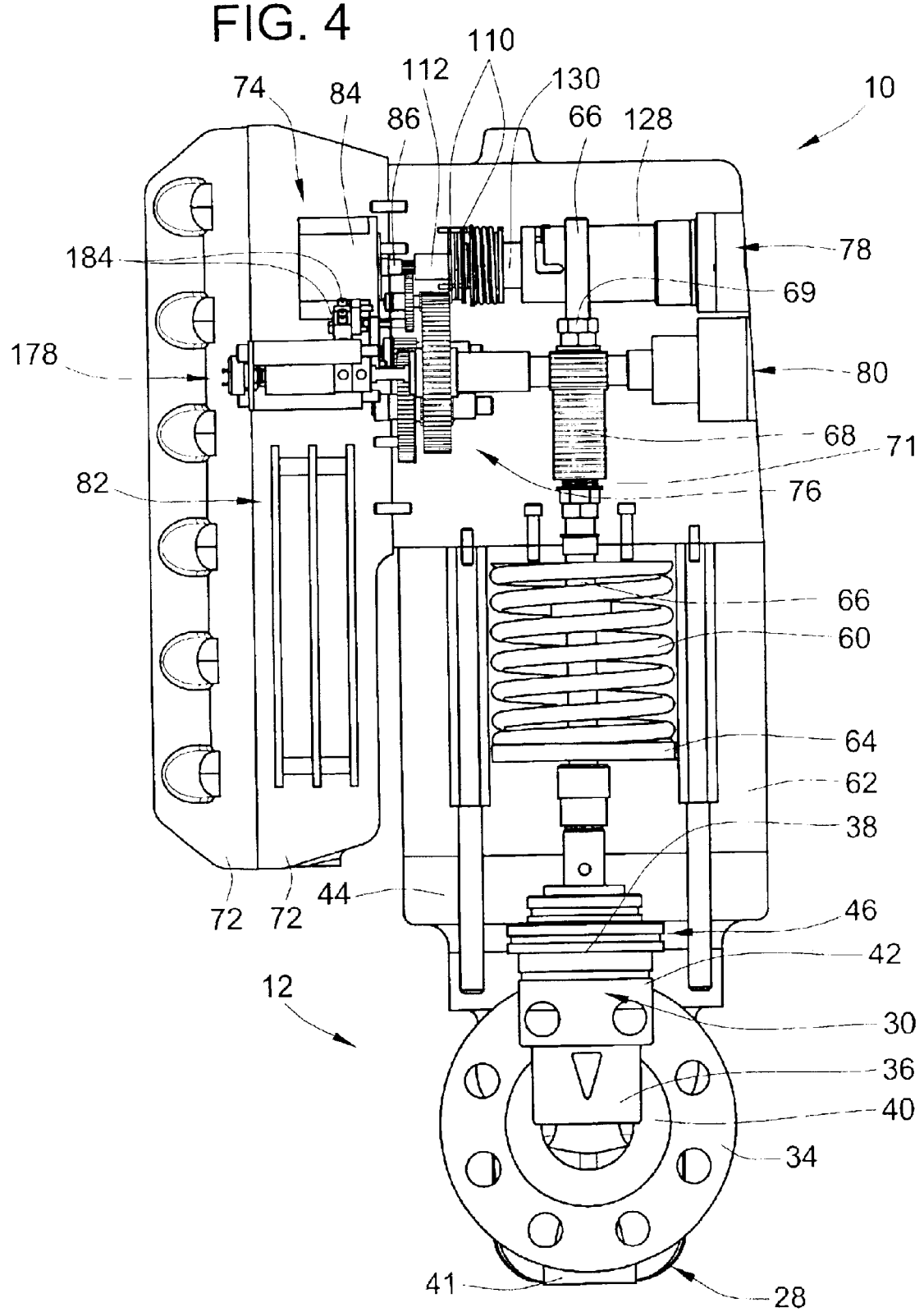
Figure 5:
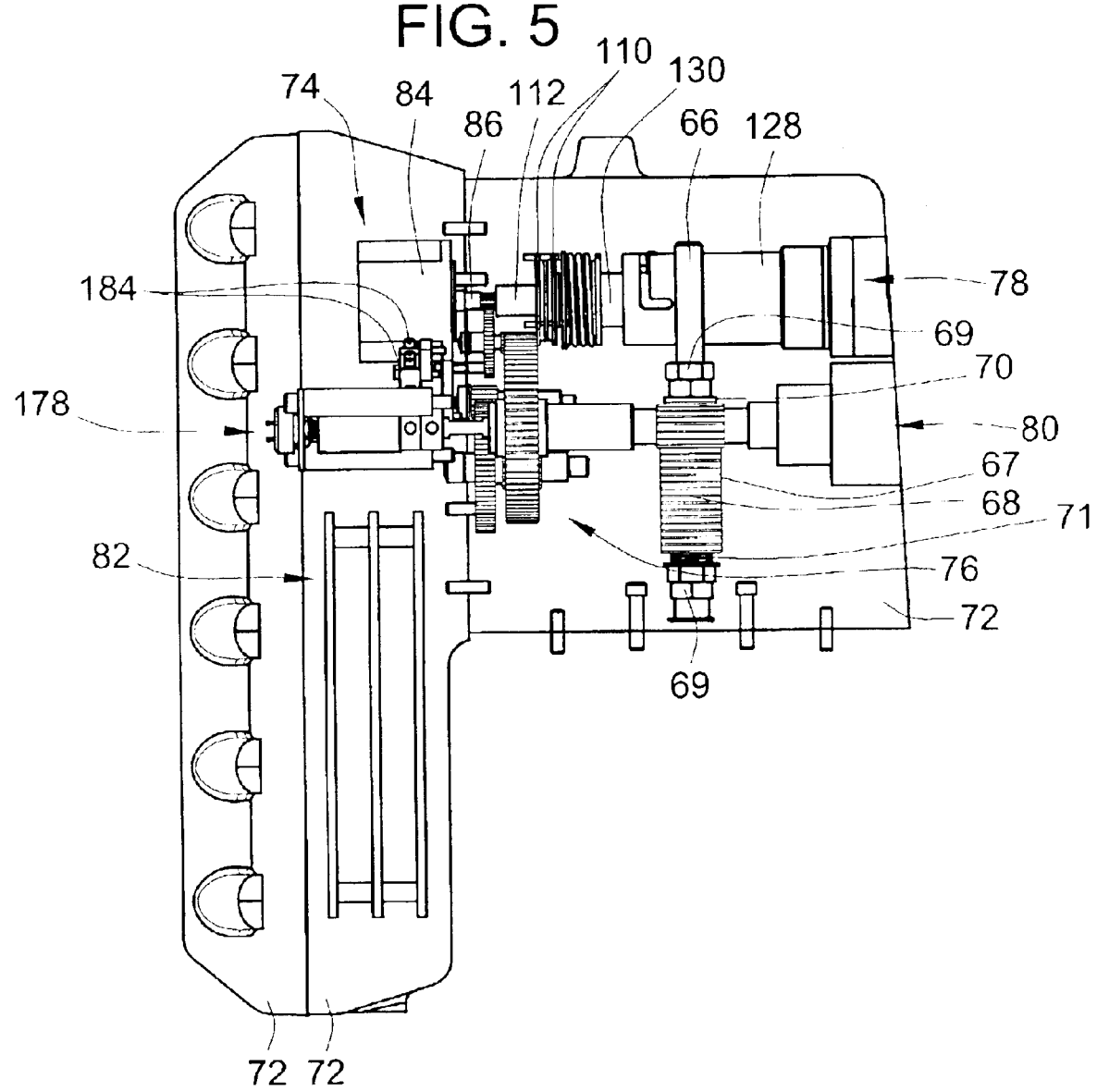
FIGS. 5 and 6 are cross sections of the electrical actuator portion of FIG. 3.
Figure 6:
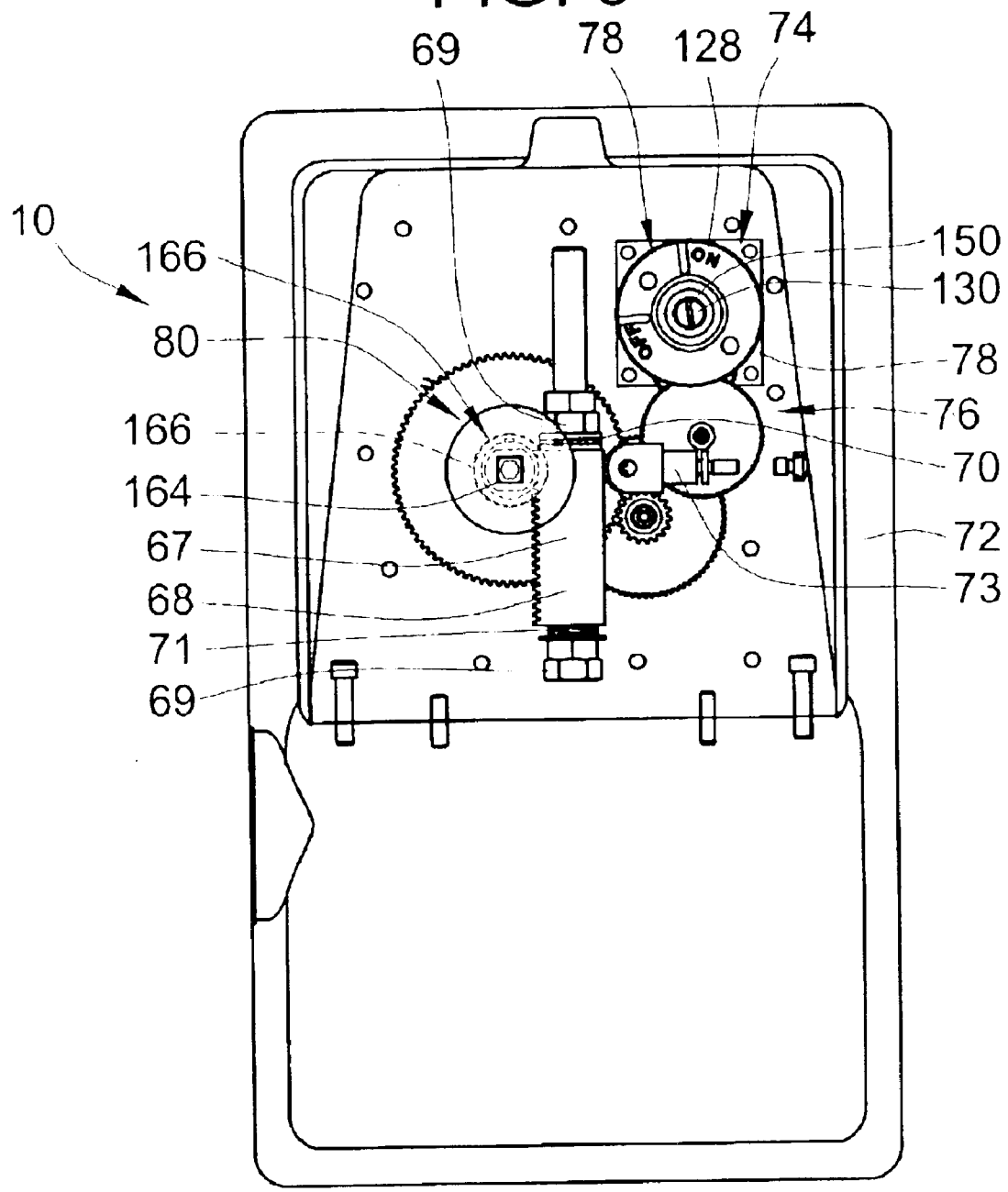
Figure 7:
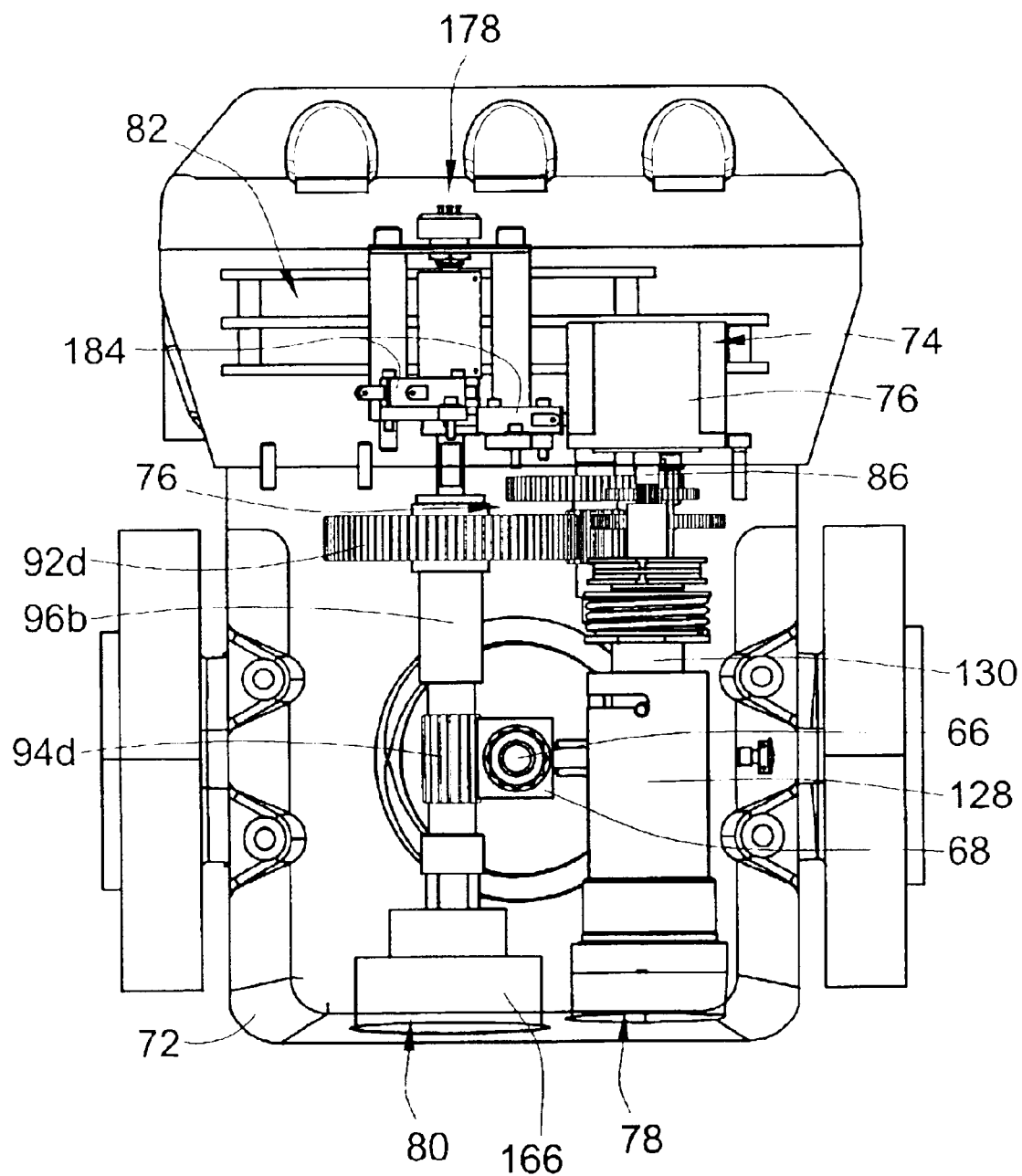
FIG. 7 is a cross section of the electrical actuator shown in the previous Figures as viewed from the top.
Figure 8:
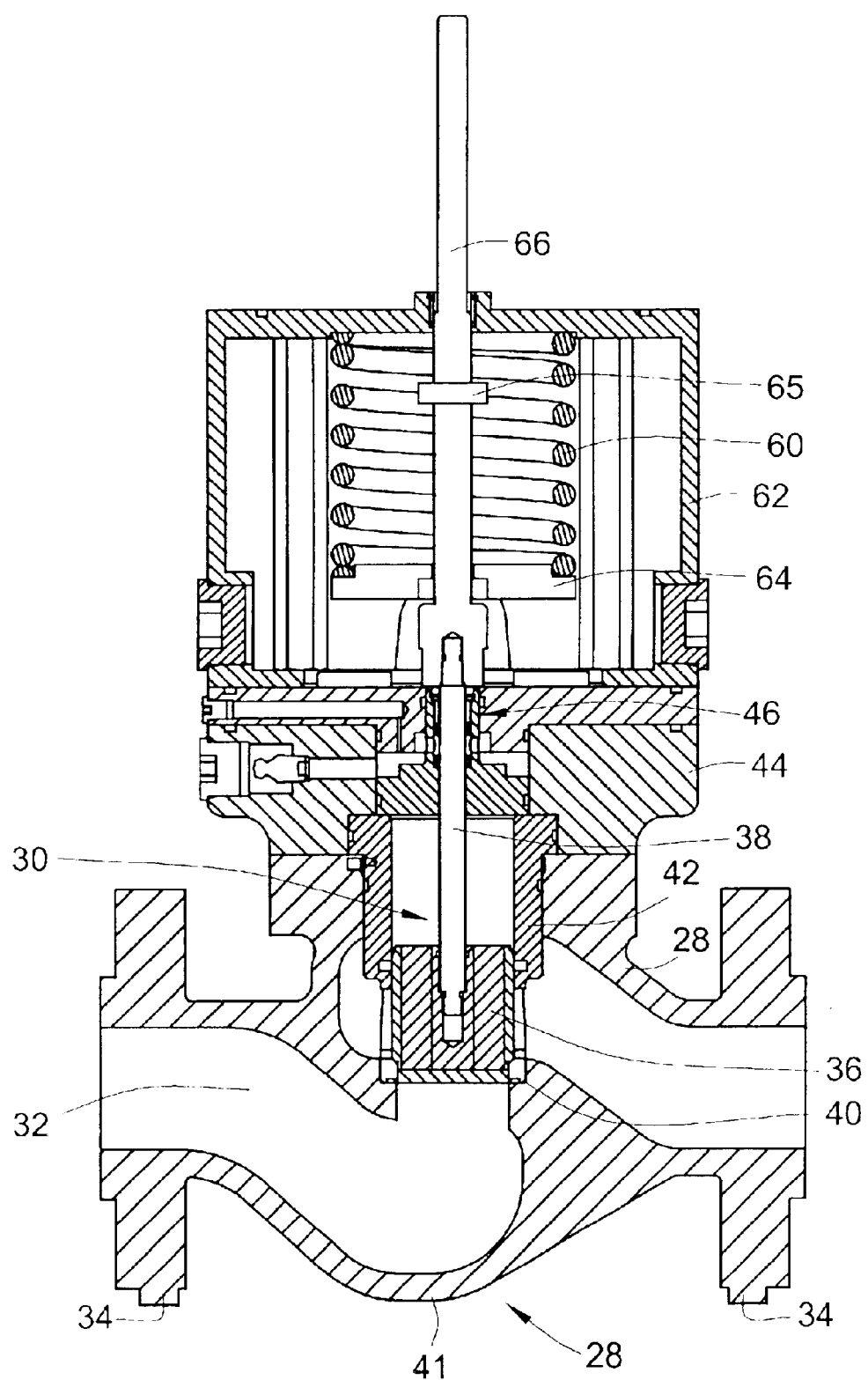
FIG. 8 is an enlarged cross section of the valve portion of the electrically actuated valve shown in FIG. 4.

The wellhead valve 12 may include a spring 60 for biasing the movable valve member 30 to either the open position or the closed position. As shown in FIGS. 3 and 8, the spring 60 is shown as a steel coil spring that is arranged to bias the valve member 30 to the closed position. A spring housing 62 mounts between the electrical actuator 10 and the valve body 41 to house and support the spring 60. The spring 60 is supported by one end of the spring housing 62 and upon a spring seat plate 64 that is supported by an actuator stem 66. One end of the actuator stem 66 engages the valve stem 38, while the other end has a drive rack 68.

Referring to FIGS. 3 and 11–13, the drive rack 68 provides a sleeve member 67 that is slid onto the actuator stem 66 such drive rack 68 can rotate relative to the actuator stem 66. A thrust bearing 70 better ensures free rotation of the drive rack 68 particularly since it is held axially in position by a wave spring 71. The sleeve member 67 is axially constrained between a pair of nuts 69 mounted on the actuator stem 66 and the wave spring 71 that biases the sleeve member 67 and drive rack 68 to a fixed position on the actuator stem 66. This arrangement allows for free rotation of the drive rack such that forces from the spring 60 do not cause the drive rack 68 to twist, thereby preventing premature wear, but it also holds the drive rack in a fixed axial position on the actuator stem. The wave spring 71 also compresses lightly when the valve member 30 contacts the seat, thereby reducing the resulting impact load on the gears. Another alternative to a rack and pinion mechanism for converting rotational energy to linear motion is a ball screw mechanism, and that and other conversion mechanisms may be used as an alternative.

It should be noted that the spring housing 62 and spring 60 are shown in FIG. 8 to be part of the wellhead valve 12. However, the spring housing 62 and spring 60 may alternatively be considered to be part of the electrical actuator and/or can be integrated into components of the electrical actuator or the valve. In either event, the spring 60 applies a biasing force to the electrically actuated valve which effectively acts both upon the valve plug member 36 and the gear reduction train 76, either directly or indirectly.

Figure 20:
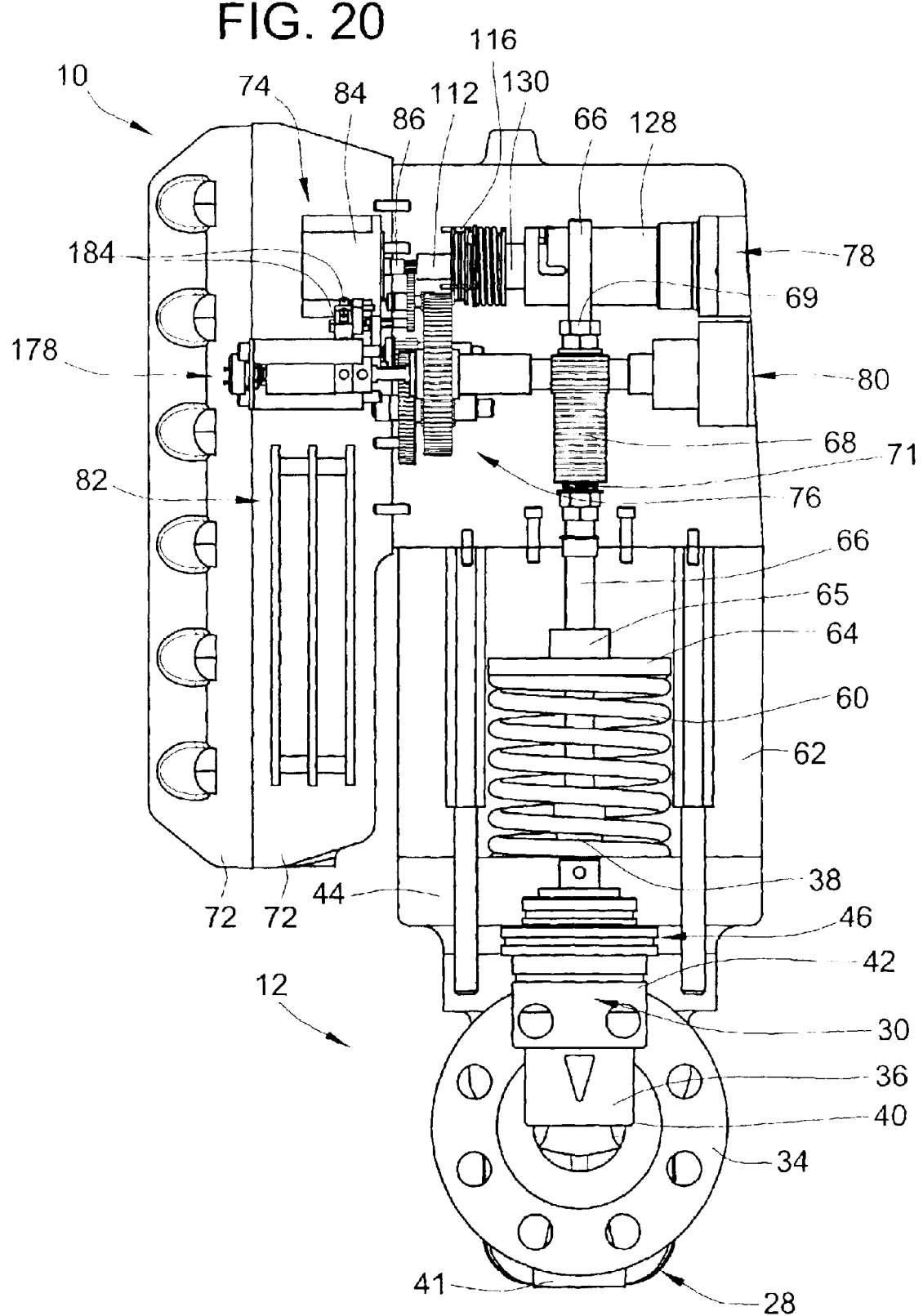
FIG. 20 is the same view as FIG. 3, except that the spring is reversed to bias the valve toward an open position.

The disclosed embodiment also provides a support structure 65 on the actuator stem 66 that provides a feature for reversing the actuation force of the spring 60 is also reversible. As shown in FIG. 20, the spring 60 may engage the other end of the spring housing 62 with the spring seating plate 64 supported by the alternative support structure 65, such that the spring as compressed between the spring seating plate 64 and the spring housing 62 biases the valve toward the open position. Thus, the spring is reversible such that the electrically actuated wellhead valve can be configured to bias the well-head valve either open or closed.

Referring to FIGS. 2–7, the electrical actuator 10 comprises an actuator housing 72 (comprised of several aluminum shells fastened together preferably in a leak proof manner) that generally contains and supports a stepper motor 74, a gear reduction train 76, a brake mechanism 78, a manual override mechanism 80 and a motor driver generically indicated as a motor controller 82. The actuator housing 72 mounts onto the spring housing 62. The stepper motor 74 is a non-incendive type motor that prevents spark formation when the electrical actuator is used around natural gas or other flammable fluids and thereby further reduces the potential for a hazardous situation should there be gas leakage. Other potential appropriate spark free types of motors include a brushless DC motor, and a spark-free AC motor.

In an embodiment of the present invention pertaining to wellhead valve applications, the controller 82 selectively energizes the motor 74. The electrical motor 74 can be operated by the controller 82 in a hold mode for holding the current position of the wellhead valve 12 and in an actuation mode for driving the wellhead valve 12. The electrical motor consumes between 1 and 3 watts in the hold mode (to provide a force that holds a current valve position with the brake off) and between 4 and 12 watts in the actuation mode. This very low power consumption makes the electrical actuator 10 capable of operating solely off an existing electrical power supply provided by a solar panel 24 and battery 26 (which local power source may have been originally intended for regulating electro-pneumatic wellhead valves).

Referring to FIGS. 11–14, the stepper motor 74 includes a motor housing or stator 84 mounted in fixed relation relative to the actuator housing 72 and a rotor comprising an output shaft 86. The output shaft 86 rotates relative to the stator 84. The output shaft 86 integrally provides a pinion gear 88 thereon (either by machining the output shaft or mounting a separate gear cog mounted thereto) which provides an input for the gear reduction train 76. The gear reduction train 76 comprises a plurality of individual reduction gears 90a–d that each comprise a larger upstream gear cog 92a–d and smaller downstream gear cog 94a–d (i.e. a "pinion" gear) that are mounted on a common gear shaft 96a–d.

The gear shafts 96a–d are rotatably mounted or supported for rotation by the actuator housing 72 in parallel relationship. The pinion gear 88 on the output shaft 86 is meshed with the larger cog 92a of the first reduction gear 90 such that the force is amplified from the motor output shaft 86 to the first gear shaft 96a. The other gears in the gear reduction train are similarly arranged with the smaller gear cogs 94a–94c driving the larger gear cogs 92b–92d, respectively. As the motor rotates, the electrical actuation force provided by the motor 74 is applied and amplified across the gear reduction train 76 from the motor output shaft 86 to the rotary output, which is then applied by the last smaller pinion gear cog 94d. The smaller gear cog 94d is meshed with the drive rack 68 to drive the drive rack 68 and thereby convert rotational energy into linear translation energy. A spring biased cam element 73 supported by the actuator housing 72 keeps the racked biased against the pinion gear cog 94d in meshed relation (this may be used as a torque limiting device to prevent damage in the event of error or an overtorquing situation). Another alternative to a rack and pinion mechanism for converting rotational energy to linear motion is a ball screw mechanism, and that and other conversion mechanisms may be used as an alternative.

In order to be sufficient for driving the wellhead valve 12 in wellhead valve systems 14, the gear train preferably has a gear reduction ratio of at least 100:1 and more preferably of at least 400:1. With such a substantial gear reduction ratio, a small motor force (e.g. consuming 4–12 watts for driving the valve with current motor technology that is readily available) is amplified by the gear reduction train to provide sufficient actuation force for driving and positioning the valve 12 against spring forces and/or fluid forces, which can be very substantial in view of the fact that well pressures can vary in a range of about 10–900 psi. Obviously, the speed of the actuation will be decreased substantially with the slew time of the valve 12 between fully open and closed positions taking about 1–5 minutes. It has been realized that a slow slew time is acceptable and does not appreciable affect well production control (particularly since production often occurs 24 hours a day with demanded changes in well output occurring on a relatively infrequent basis). This is also particularly true when considering the significant advantages associated with reducing and in fact eliminating for all practical purposes all fugitive gas emissions using the local power source typically provided at wellhead valve sites.

Referring to FIGS. 15–19, the brake mechanism 78 acts at least partially through the gear reduction train 76 and as shown in the disclosed embodiment, directly on the output shaft 86 of the motor 74. The brake mechanism 78 may act on the motor pinion 88 to retard the forces of the return spring and/or fluid pressure forces transmitted through the gear train such that only a fraction of the force is transmitted to the motor shaft 86 of the motor 74. Thus the brake mechanism 78 may be used to greatly reduce the amount of holding force needed by the motor to hold a current position of the valve, or to completely eliminate a holding force to maintain a current valve position.

The brake mechanism 78 includes a pair of brake calipers 110 and a rotor 112. The calipers 110 include slots 114 on their outer peripheries that receive stationary support pins 116 which are supported and mounted into, by and extend from the actuator housing 72. The pins 116 hold the calipers 110 stationary and prevent rotation of the calipers 110. The outer caliper 110 is also axially abutted up against and supported by the actuator housing 72. The rotor 112 includes a sleeve portion 118 that is splined to the output shaft 86, and a plate portion 120 sandwiched axially between the brake calipers 110. The calipers 110 include radially inward projecting circular ribs 122 that frictionally engage the rotor plate portion 120 when the brake is engaged in the on position. The ribs 122 are relatively thin radially to provide a substantially constant diameter ring that engages the rotor 112 to provide a more consistent braking force (e.g. thereby avoiding slippage at a smaller diameter that could occur with a radially wider brake pad caliper). A braking spring 124 applies an axial force to frictionally engage the calipers 110 against opposing sides of the rotor 112.

Figure 18A:
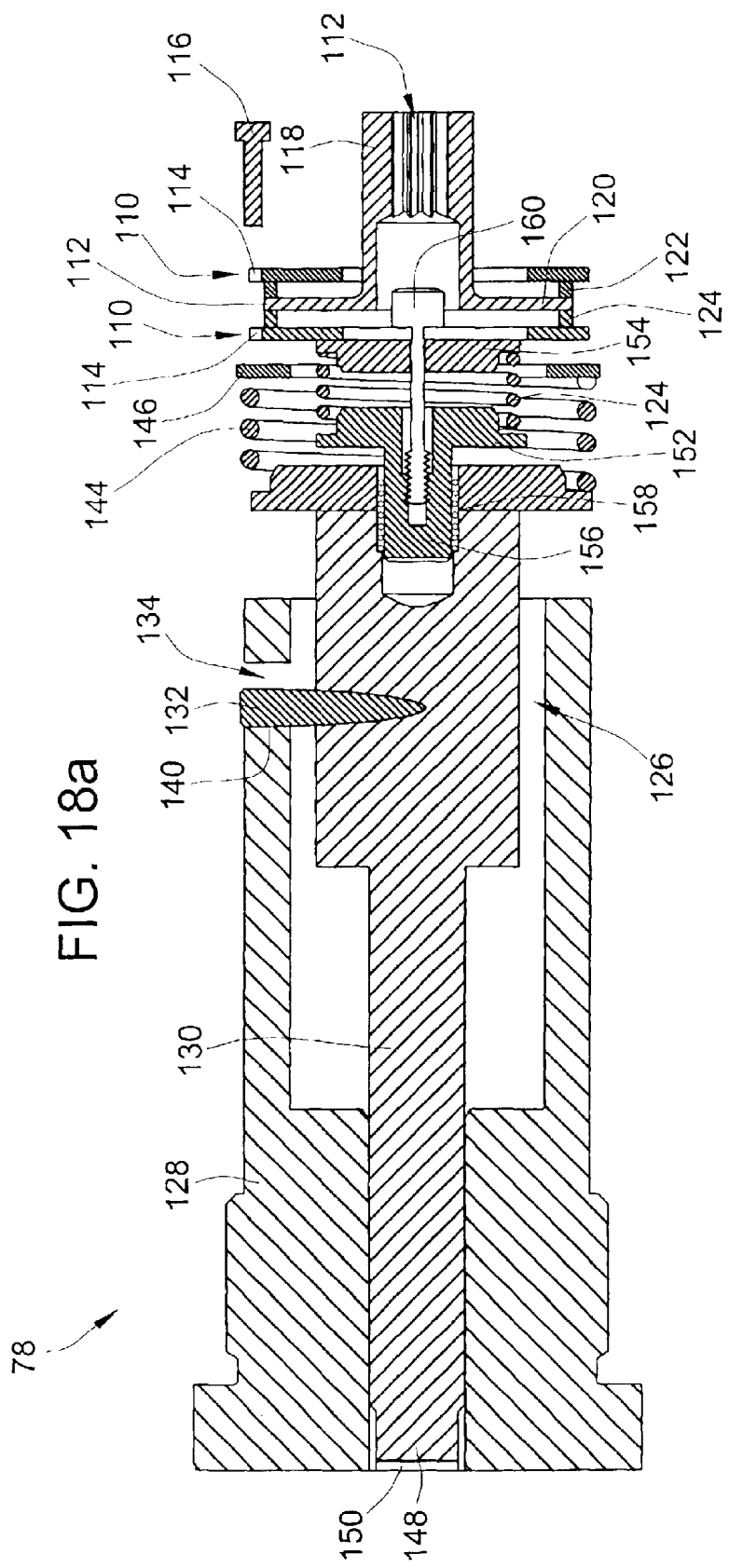
FIGS. 18a and 18b are cross sections of the brake mechanism shown in FIGS. 15–17, illustrated in the on and off positions, respectively.
Figure 18B:
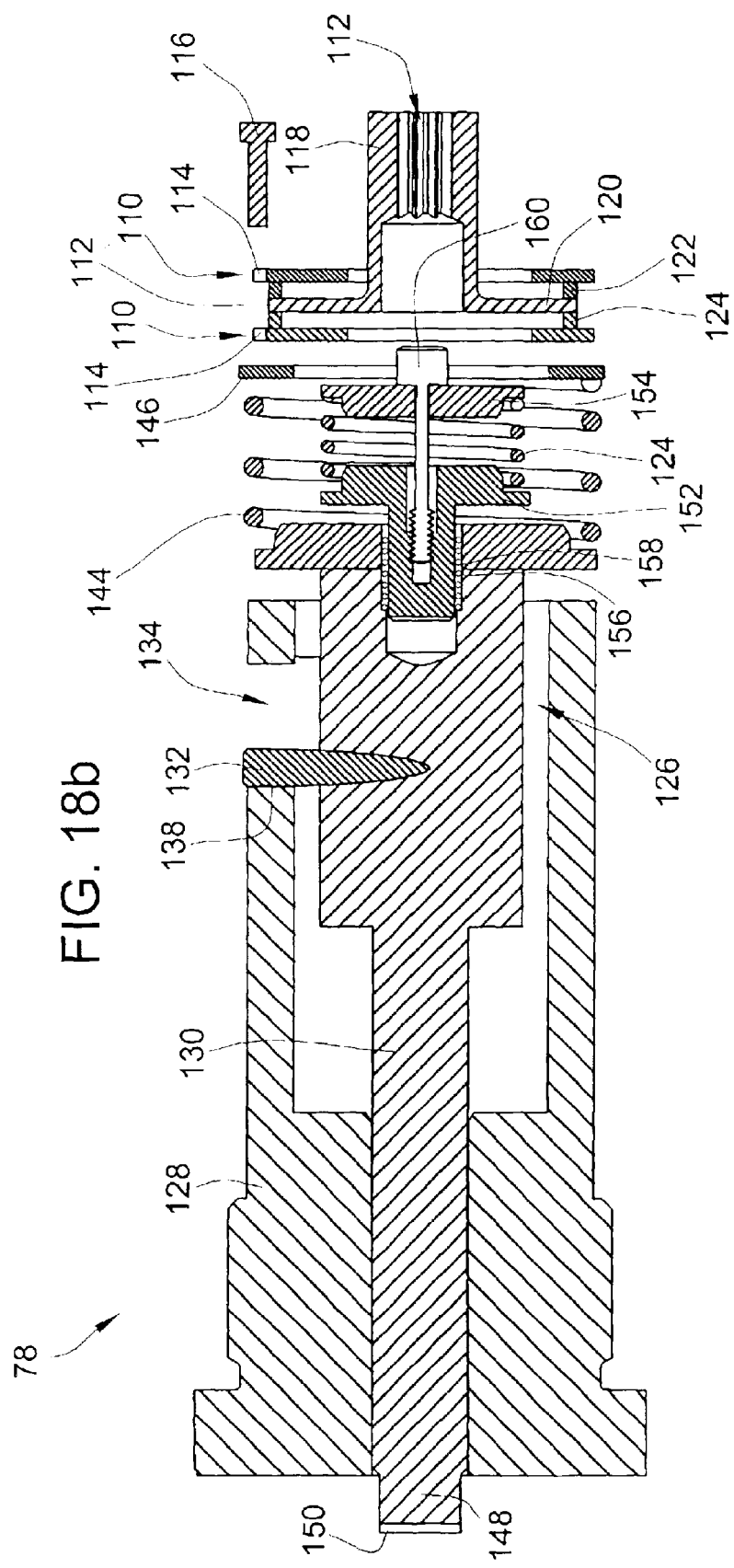
Figure 19:
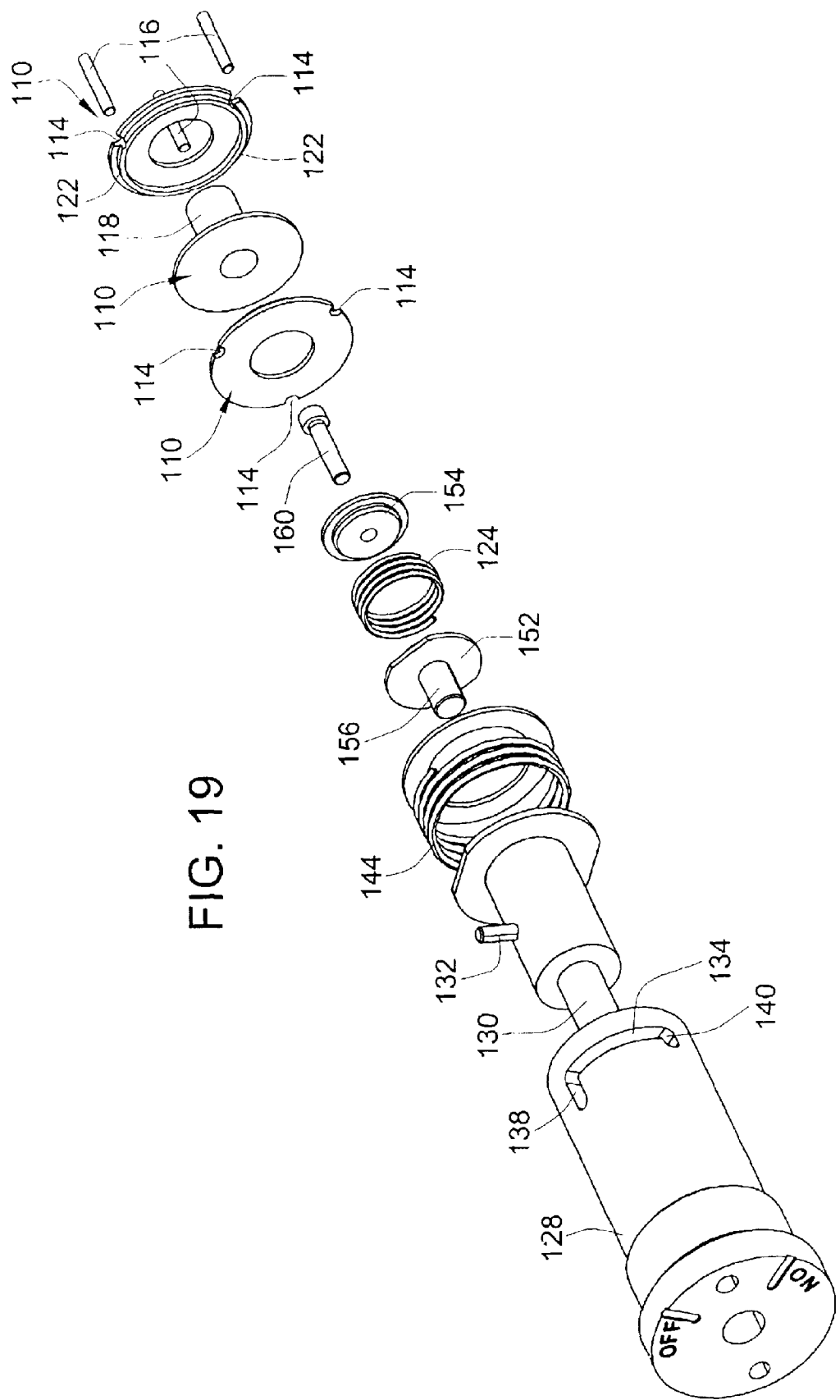
FIG. 19 is an exploded assembly view of the brake mechanism shown in FIGS. 15–18.

Although the brake mechanism 78 may be permanently positioned in the on position and therefore designed solely as a dynamic brake, preferably the brake mechanism also includes an actuator device 126 for manually engaging and disengaging the brake between on and off positions as shown in FIGS. 18a and 18b. The brake may have different levels of engagement as well to provide different levels of braking force. In the disclosed embodiment, the actuator device 126 includes a sleeve shaped support housing 128 that threads into or otherwise mounts into the actuator housing 72. The actuator device 126 also includes shank shaped selector switch member 130 that is slidably inserted into the support housing 128 for rotation and linear movement relative to the support housing 128.

The linear and rotational movement of the switch member 130 relative to the support housing 128 is constrained with a pin 132 and slot 134 mechanism. The pin 132 is securely mounted to switch member 130 and extends radially outward therefrom into the slot 134, which is defined by the support housing 128. The slot 134 includes first and second axially extending legs 138, 140 that correspond to the on and off positions, respectively, and a radially extending intermediate section 142 separating the legs 138, 140. The first leg 138 is longer than the second leg 140 to provide for on and off positions. An outer spring 144 is supported by a washer 146 that is held stationary in a fixed position by the actuator housing 72. The outer spring 144 axially biases the switch member 130 toward the support housing 128 such that the pin 132 is restrained and urged toward the terminating end of leg when the pin 132 is positioned in either of the legs 138, 140.

Figure 15:
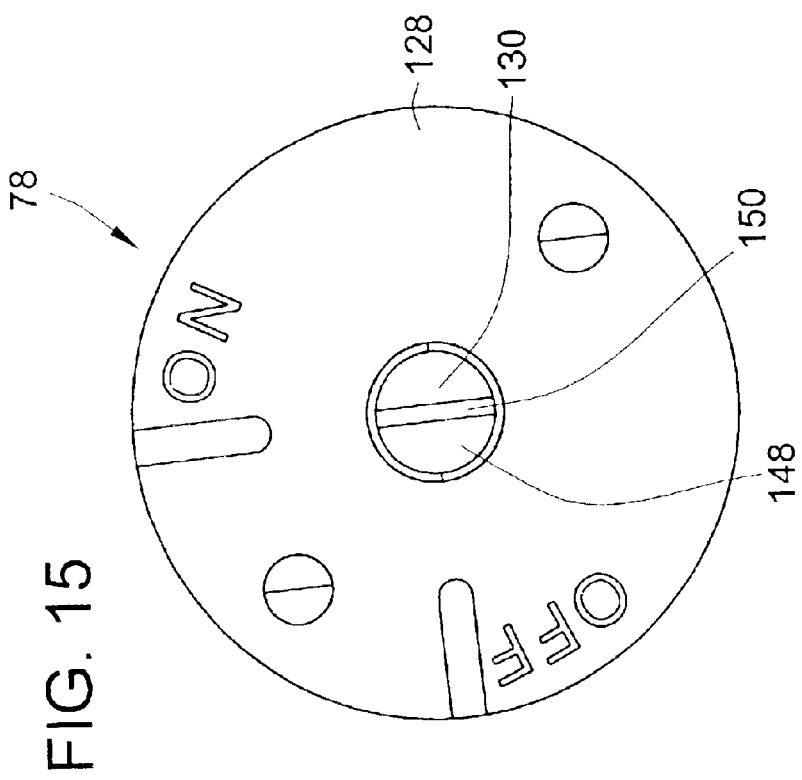
Figure 16:
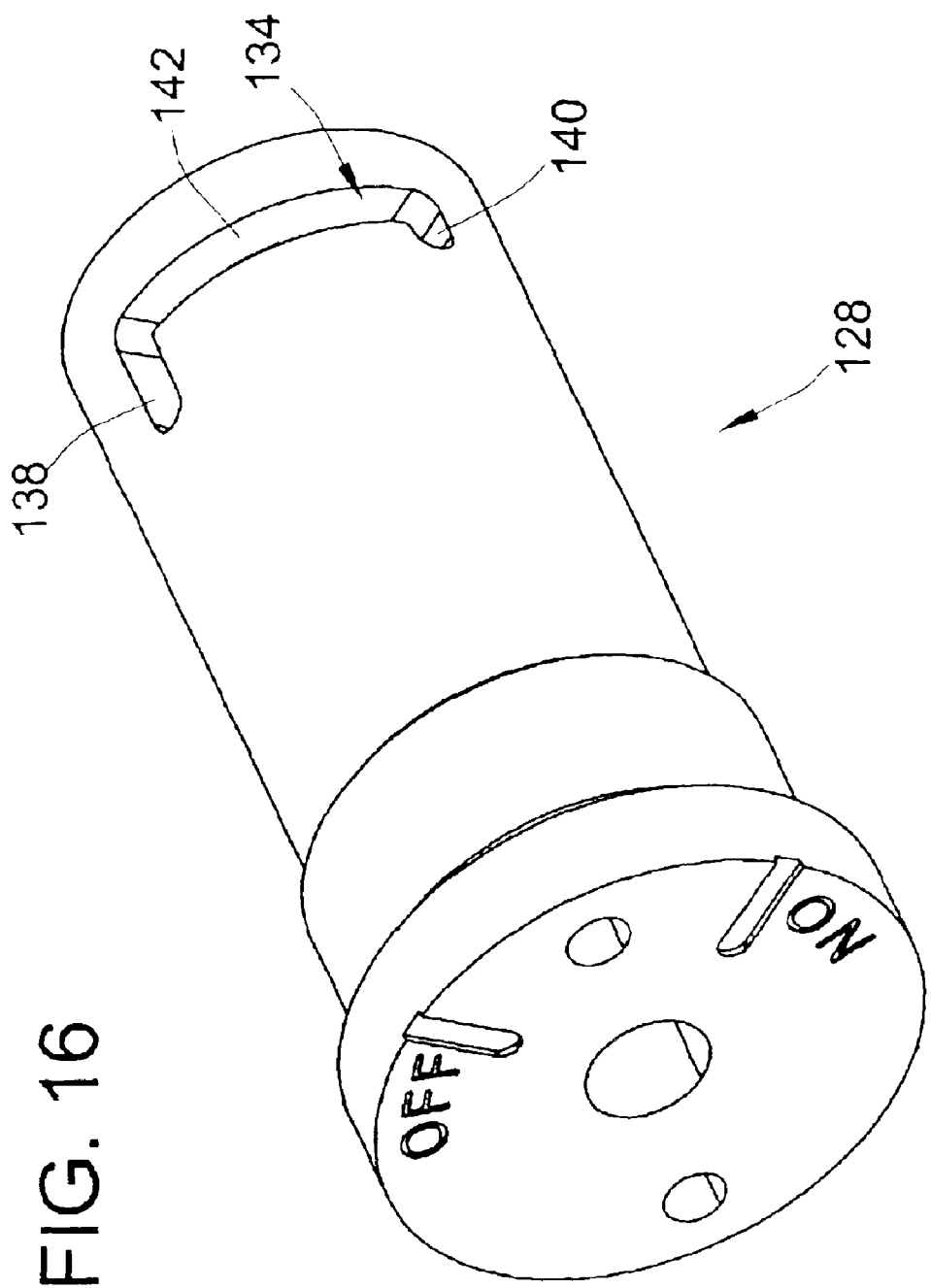
FIG. 16 is an isometric view of the brake housing.

The switch member 130 includes an actuating stem portion 148 that extends through a central hole in the support housing 128. The stem portion 148 includes a manually crankable head portion exposed on the outside of the actuator housing 72. The crankable head portion is shown as including a screwdriver slot 150 or other structure that is adapted to be rotated by a tool or crank mechanism. As shown in FIGS. 18a, 18b, the switch member 130 can be manually pushed inward against the action of the outer return spring 144 and manually rotated between on and off positions (as indicated on the outside of the support housing as shown in FIG. 15).

The selector switch member 130 carries the brake spring 124 that is adapted to apply the axial braking force to the brake calipers 110. The brake spring 124 is supported at one end by a spring seat 152 and axially urges a brake applicator plate 154 away from the selector switch member 130. The spring seat 152 includes a threaded stem 156 that threads and locks into a threaded opening 158 in the selector switch member 130, via a self-locking thread such that the position of the spring seat 152 is fixed relative to the selector switch member 130. How far the spring seat 152 is screwed into the selector switch member 130 generally determines and is used during assembly to gauge and set the braking force that is applied in the on position for the brake mechanism 78. The brake applicator plate 154 is axially movable relative to the spring seat 152. A shoulder bolt 160 extends through the brake applicator plate 154 and is mounted into the spring seat 152. The shoulder bolt 160 supports and guides axial sliding movement of the applicator plate 154.

When the brake mechanism 78 is in the on position as shown in FIG. 18a, the braking spring 124 urges the applicator plate 154 against the inner brake caliper 110 such that the spring compresses the brake calipers 110 against the rotor 112. When the brake mechanism 78 is in the off position as shown in FIG. 18b, the braking spring 124 urges the applicator plate 154 against the head of the shoulder bolt 160 which acts as a stop to prevent the spring from acting upon the calipers 110.

Also provided in the electrical actuator 10 is the manual override mechanism 80 which includes a crankable input shaft 162 that includes a head with a rectangular structure 164 that can be engaged and rotated by a manual crank or tool. The input shaft 162 is journalled in the actuator housing 72. The input shaft 162 acts through a torque limiting clutch 166 (or other torque limiting device, e.g. a shear pin) upon one of the gear shafts 90d such that rotation of the input shaft 162 is operable to linearly the valve member 30 manually. The torque limiting clutch 166 prevents manual overtorquing of the apparatus and thereby prevents damage to the drive rack 68 and the drive pinion 94d that could otherwise occur with manual overtorquing. The torque limiting clutch 166 may include an input plate coupled to the input shaft 162 that frictionally engages an output plate coupled to the gear shaft 90d. At a predetermined force or torque, the plates of the clutch 166 slip relative to each other to prevent overdriving of the valve. The clutch 166 is set such that the predetermined torque at which slippage occurs is small enough to prevent damage to the wellhead valve 12 from manual overtorquing but large enough to be sufficient to overcome all braking and biasing forces acting on the valve such as those caused by the brake mechanism 78 and the valve biasing spring 60, whereby the manual override mechanism 80 is manually operable to drive the valve member 30 to a selected position between fully open and fully closed positions, even with the brake mechanism 78 engaged in the on position. The head of the input shaft 162 has a pointer 172 and the actuator housing 72 has a scale 174 that indicate the degree of opening of the valve 12. The pointer 172 and scale 174 are used to indicate the position of the valve visually and for maintenance personnel when adjusting the valve manually.

A significant feature of the disclosed embodiment is that the electrical actuator 10 is configurable between three different possible modes of operation. Configuration is accomplished by having a biasing force of the spring 60 that is manually reversible and a brake mechanism 78 that also has on and off positions such that the spring 60 can drive the gear reduction train 76 and valve member 30, or the brake mechanism 78 can be used to hold valve position, when there is electrical power loss. The electrical actuator 10 thus has three different configurable operational modes upon power loss to the electrical motor 74, including a fail-open mode wherein the spring is arranged to urge the gear reduction train 76 and valve member 30 toward the fully open position upon power loss 60 with the brake mechanism 78 in the off position, a fail-close mode wherein the spring 60 is arranged to urge the gear reduction train 76 and valve member 30 toward the fully closed position upon power loss with the brake mechanism 78 in the off position, and a fail-fix mode wherein the brake mechanism 78 is in the on position and holds the current position of the gear reduction train 76 and the valve member 30.

Multiple position sensing devices are employed in the disclosed embodiment. First, the motor controller 82 integrally incorporates an analog position sensor 176 that derives position of the rotary output from motor position control signals sent to the electrical stepper motor 74. The analog position sensor is a form of an accumulator or counter that adds numbers and subtracts numbers from a count as the stepper motor 74 is driven to electronically derive position of the valve 12. The changes in valve position are linearly proportional to the changes in the count of the analog position sensor 176. The disclosed embodiment also includes a redundant position sensor electrically wired and providing feedback to the motor controller 82, which is shown in the form of a potentiometer 178. The potentiometer 178 is positioned by a cam that is acted upon by an eccentric surface on an extended portion of the last gear shaft 96. The potentiometer 178 provides redundant feedback that is used to check the accuracy of the analog position sensor 176 which could have error should there be a loss of electrical power or slippage in the stepper motor 74. Finally, the disclosed embodiment may also include limit switches 184 that are mounted proximate the last gear shaft 96*d* at set points representing the end of travel for the wellhead valve 12 also defined as the fully open and fully closed positions. The extended output gear shaft 96*d* includes cam eccentrics which trigger the limit switches 184 at the set points. The limit switches 184 are electrically wired to a customer interface to provide indication of when the valve is at a set point. This provides independent feedback to check accuracy of operation. Alternatively, the limit switch signals can be used to shut off power to the motor 74 to ensure that the controller 82 does not signal the motor to drive the valve past either of the fully open or closed positions. The limit switches 184 are also adjustable and manually rotatable relative to the output shaft 96*d* such that if an end user wishes to define a different end of travel range, the end user can manually configure and define the end of travel range as he deems fit.

Referring to FIG. 1, the system 14 may also include a wireless transceiver 186 powered by the local power source that is in electrical communication with one or both of the controllers 22, 82. It should be noted that the first controller 22 is provided at a wellhead valve site typically external to the electrical actuator 10 to provide system level control. The motor controller 82 is more of a motor driver to facilitate control over the driving of the electrical actuator 10 and positioning of the wellhead valve 12. In any event, the wireless transceiver 186 can receive remote control input and demand signals wirelessly from a remotely positioned transceiver 188, such that either or both of the controllers 22, 82 can be remotely controlled to adjust position of he wellhead valve 12 wirelessly. The transceiver 186 can also transmit feedback to a remote location and thereby inform maintenance personnel about the operating parameters at the well head site (e.g. flow rate, valve position, power levels, malfunctions, ect.).

Another alternative aspect of an embodiment may be the incorporation of a sleep mode for the electrical actuator 10 in which it consumes virtually no electrical power and powers itself down automatically when the valve 12 is correctly positioned. According to this mode, the brake mechanism 78 is normally in the on position and therefore acting as dynamic brake arranged to provide resistance to movement of the valve 12. Since the brake mechanism 78 when on provides sufficient force to prevent backdriving of the gear train upon power loss, the brake mechanism 78 is operable to hold a current position for the wellhead valve 12. The electrical motor 74 provides sufficient force and torque to cause the brake to slip and thereby overpower the brake to move the wellhead valve 12 when desired. The sleep mode further provides for energy efficiency and lowers power consumption when electrical power in these remote locations is scarce.

Figure 21:
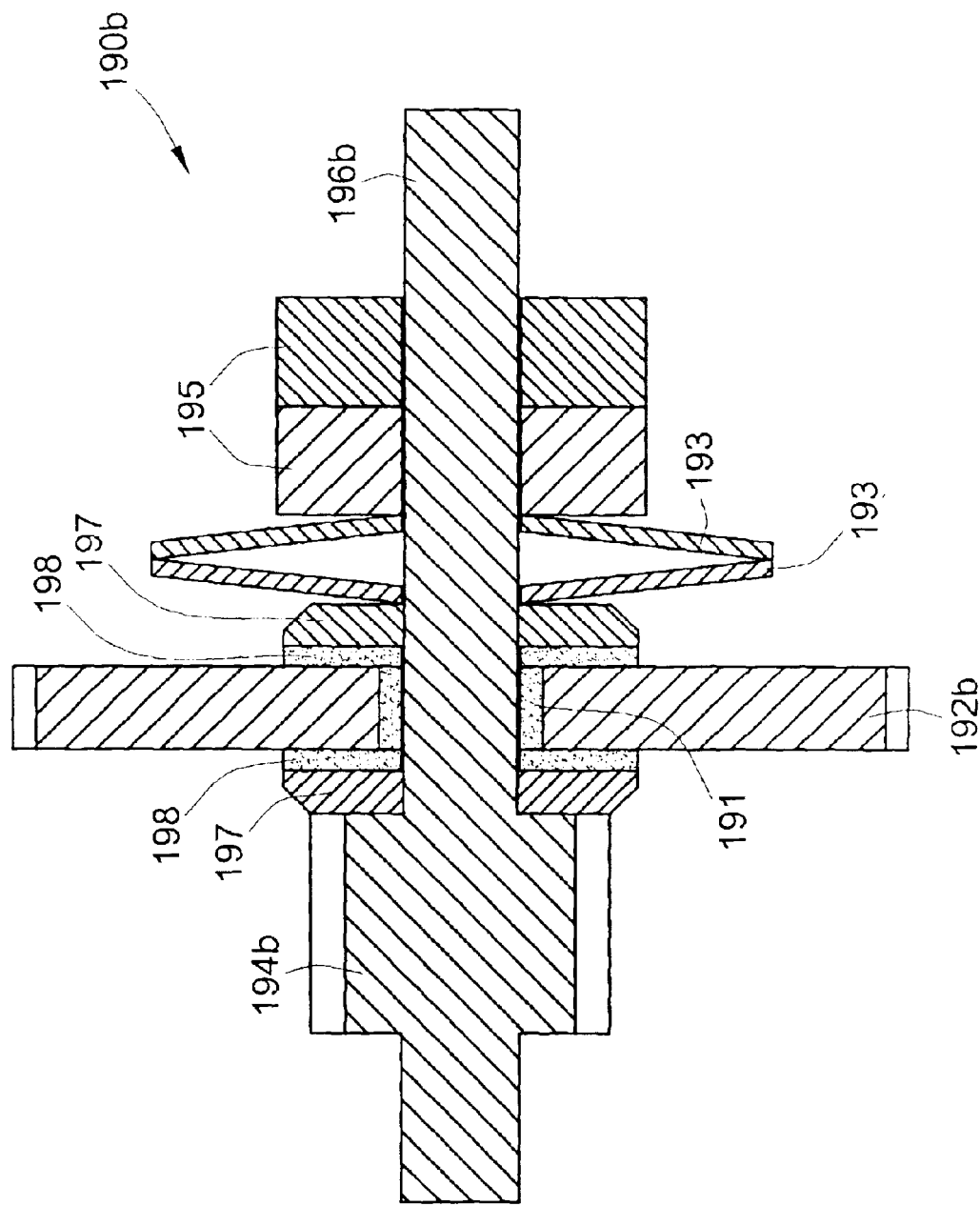
FIG. 21 is a cross section of a drop in clutch gear which may be used in the electrical actuator, being substituted for one of the gears.
Figure 22:
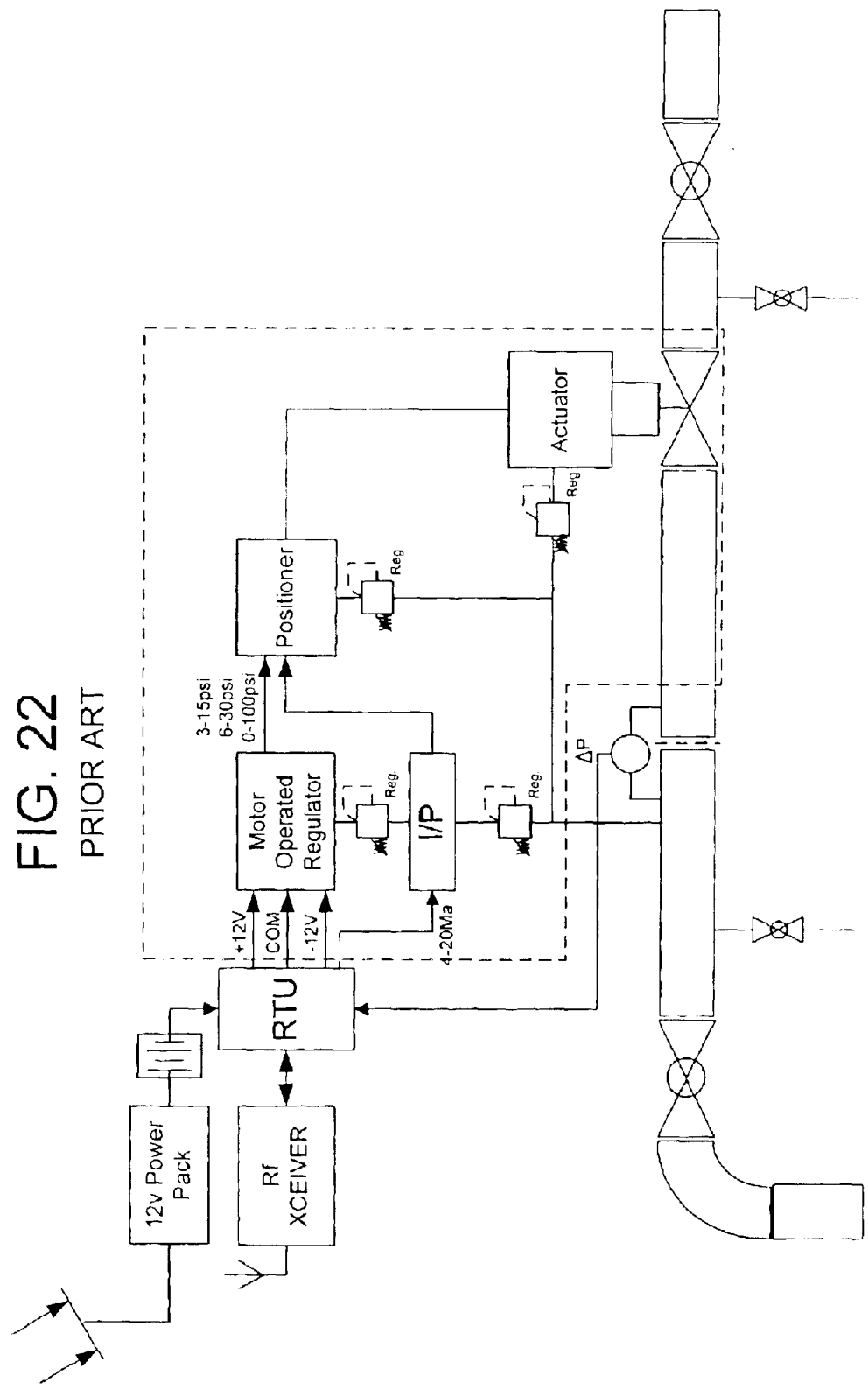
FIG. 22 is a schematic view of a commonly employed control system for a well head valve.

Another feature shown in FIG. 21 is an alternative drop in clutch reduction gear 190*b* that can replace reduction gear 90*b*. The clutch reduction gear 190*b* is particularly useful and can be used for the actuator when configured for fail-open mode, in which the spring 60 is arranged to bias the valve open as shown in FIG. 20. The clutch reduction gear 190*b* similarly includes a larger gear cog 192*b* and smaller pinion gear cog 194*b* on a gear shaft 196*b*. As shown, the larger gear cog 192*b* is slidably mounted with a sleeve bushing 191. A pair of spring washers 193, supported by axially fixed bearing support members 195 (which are supported by the actuator housing) urge a pair of support plates 197 and frictional engaging discs 198, with the larger gear cog 192*b* therebetween, together against the pinion gear 194*b*. The support plates 197 are splined or keyed to the shaft 196*b* such that the compression applied by the spring washers 193 is operable to lock the larger gear cog 192*b* to the shaft 196*b* below a predetermined torque and allow rotational slippage of the larger gear cog 192*b* above the predetermined torque. The advantage of the clutch mechanism incorporated into the reduction gear 190*b* is that slippage at a predetermined torque occurs. When using a stepper motor 74, slippage can occur within the stepper motor at high loads. By setting slippage in the clutch reduction gear at a lower load (accounting for gear amplification), this better ensures that slippage in the stepper motor 74 does not occur which could otherwise allow the spring to move the valve to an undesired position.

Finally, although the present invention is shown for use in controlling or regulating natural gas at a well head, the present invention may have other applications. For example, the actuator 10 may be used with a valve for regulating the flow of other types of process fluid, including other types of gases and liquids.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrically actuated valve, comprising:
an electrical motor adapted to rotate an output shaft,
a gear reduction train comprising a plurality of gears including an input gear driven by the output shaft and a rotary output, the plurality of gears adapted to amplify force from the input gear to the rotary output when the electrical motor rotates the output shaft;
a manual override input acting upon the gear reduction train;
a brake having on and off positions acting upon the gear reduction train, the brake when in the on position adapted to prevent backdriving of the gear reduction train;
a valve adapted to control fluid flow therethrough, the valve including a valve housing and a valve member, the valve housing defining a flow passage, the valve member movable in the valve housing between open and closed positions to control a degree of opening of the flow passage; and
a spring arranged to urge the valve to one of the open and closed positions, the brake when in the on position providing sufficient resistance to hold a current position of the valve against the action of the spring, and wherein the motor has a sufficient rotary output force to overcome resistance of the brake when in the on position to move the valve.

2. The electrically actuated valve of claim 1 wherein a biasing force of the spring is manually reversible, wherein the electrically actuated valve has three different configurable operational modes upon power loss to the electrical motor, including a fail-bias open mode wherein the spring is arranged to urge the valve to the open position upon power loss with the brake in the off position, a fail-bias closed mode wherein the spring is arranged to urge the valve to the closed position upon power loss with the brake in the off position, and a fail-fix mode wherein the brake is in the on position and holds the current position of the valve.

3. An electrically actuated valve, comprising:
an electrical motor adapted to rotate an output shaft,
a gear reduction train comprising a plurality of gears including an input gear driven by the output shaft and a rotary output, the plurality of gears adapted to amplify force from the input gear to the rotary output when the electrical motor rotates the output shaft;
a manual override input acting upon the gear reduction train;
a brake having on and off positions acting upon the gear reduction train, the brake when in the on position adapted to prevent backdriving of the gear reduction train;
a valve adapted to control fluid flow therethrough, the valve including a valve housing and a valve member, the valve housing defining a flow passage, the valve member movable in the valve housing between open and closed positions to control a degree of opening of the flow passage; and a clutch coupling the manual override input to the gear reduction train, the clutch configured to slip at a predetermined torque to prevent overtorquing of the valve and to grab at a predetermined torque sufficient to overpower the brake when in the on position.

4. An electrically actuated valve, comprising:
an electrical motor adapted to rotate an output shaft,
a gear reduction train comprising a plurality of gears including an input gear driven by the output shaft and a rotary output the plurality of gears adapted to amplify force from the input gear to the rotary output when the electrical motor rotates the output shaft;
a manual override input acting upon the gear reduction train;
a brake having on and off positions acting upon the gear reduction train, the brake when in the on position adapted to prevent backdriving of the gear reduction train; and
a valve adapted to control fluid flow therethrough, the valve including a valve housing and a valve member, the valve housing defining a flow passage, the valve member movable in the valve housing between open and closed positions to control a degree of opening of the flow passage;
wherein the brake is movable between the on position and the off position via a manually driven selector switch.

5. An electrical actuator, comprising:
an electrical motor adapted to rotate an output shaft;
a gear reduction train comprising a plurality of gears including an input gear driven by the output shaft and a rotary output, the plurality of gears adapted to amplify force from the input gear to the rotary output when the electrical motor rotates the output shaft;
a manual override input acting upon the gear reduction train; and
a brake having an on position in which the brake is adapted to prevent backdriving of the gear reduction train;
wherein a spring is arranged to urge the gear reduction train in a predetermined direction, the brake when in the on position providing sufficient resistance to hold a current position of the gear reduction train against the action of the spring, and wherein the electrical motor has a sufficient rotary output force to overcome resistance of the brake when in the on position to drive the gear reduction train.

6. The electrical actuator of claim 5 wherein a biasing force of the spring is manually reversible and the brake has an off position, wherein the electrically actuator has three different configurable operational modes upon power loss to the electrical motor, including a first fail-bias mode wherein the spring is arranged to urge the gear reduction train in a first direction to a first limit upon power loss with the brake in the off position, a second fail-bias mode wherein the spring is arranged to urge the gear reduction train in a second direction to a second limit upon power loss with the brake in the off position, and a fail-fix mode wherein the brake is in the on position and holds the current position of the gear reduction train.

7. An electrical actuator, comprising:
an electrical motor adapted to rotate an output shaft;
a gear reduction train comprising a plurality of gears including an input gear driven by the output shaft and a rotary output, the plurality of gears adapted to amplify force from the input gear to the rotary output when the electrical motor rotates the output shaft;

a manual override input acting upon the gear reduction train;

a brake having an on position in which the brake is adapted to prevent backdriving of the gear reduction train; and a clutch coupling the manual override input to the gear reduction train, the clutch configured to slip at a predetermined torque to prevent overtorquing of the gear reduction train and to grab at a predetermined torque sufficient to overpower the brake when in the on position.

8. An electrically actuated valve, comprising:

an electrical motor adapted to rotate an output shaft, a gear reduction train comprising a plurality of gears including an input gear driven by the output shaft and a rotary output, the plurality of gears adapted to amplify force from the input gear to the rotary output when the electrical motor rotates the output shaft;

a manual override input acting upon the gear reduction train;

a brake having on and off positions acting upon the gear reduction train, the brake when in the on position adapted to prevent backdriving of the gear reduction train; and a valve adapted to control fluid flow therethrough, the valve including a valve housing and a valve member, the valve housing defining a flow passage, the valve member movable in the valve housing between open and closed positions to control a degree of opening of the flow passage;

wherein the valve is a wellhead valve adapted to be mounted to a collection pipe for regulating process fluid flow from a well, wherein the electrical motor is adapted to be powered through a controller by a local power source proximate the well, the local motor providing sufficient actuation force utilizing only the local power source through force amplification by the gear reduction train to drive the valve despite spring forces and/or fluid forces acting upon the wellhead valve.

9. The electrically actuated valve of claim 8, further comprising a spring arranged to urge the valve to one of the open and closed positions, the brake when in the on position providing sufficient resistance to hold a current position of the valve against the action of the spring, and wherein the motor has a sufficient rotary output force to overcome resistance of the brake when in the on position to move the valve.

10. The electrically actuated valve of claim 9, wherein a biasing force of the spring is manually reversible, wherein the electrically actuated valve has three different configurable operational modes upon power loss to the electrical motor, including a fail-bias open mode wherein the spring is arranged to urge the valve to the open position upon power loss with the brake in the off position, a fail-bias closed mode wherein the spring is arranged to urge the valve to the closed position upon power loss with the brake in the off position, and a fail-fix mode wherein the brake is in the on position and holds the current position of the valve.

11. The electrically actuated valve of claim 8, wherein the wellhead valve comprises a valve housing and a valve member slidably mounted in the valve housing for linear reciprocation, the valve member being coupled to a rack, the gear reduction train including an input pinion gear on a rotary output shaft of the electrical motor, an output pinion gear meshed with the rack for driving the rack, and a plurality of intermediate gears between the input and output pinion gears wherein speed is reduced and torque is increased from the input pinion gear to the output pinion gear.

12. The electrically actuated valve of claim 8, further comprising a clutch coupling the manual override input to the gear reduction train, the clutch configured to slip at a predetermined torque to prevent overtorquing of the valve and to grab at a predetermined torque sufficient to overpower the brake when in the on position.

13. The electrically actuated valve of claim 8, wherein the brake is movable between the on position and the off position via a manually driven selector switch.

14. The electrically actuated valve of claim 8, wherein the brake acts directly upon the output shaft, the brake including a rotor element integral with the output shaft.

15. The electrically actuated valve of claim 8, further comprising a controller controlling energizing of the electrical motor, the controller incorporating an analog position sensor that derives position of the valve from motor position control signals sent to the electrical motor, further comprising a redundant position sensor in sensory communication with the valve providing feedback to the controller for checking the accuracy of the analog position sensor.

16. The electrically actuated valve of claim 15, further comprising limit switches indicating pre-selected positions of the valve.

17. The electrically actuated valve of claim 8, further comprising an actuator housing, a spring housing and a spring, the actuator housing containing and rotatably supporting the gears, the spring housing containing the spring and being interposed between the valve housing and the actuator housing, the valve member including a plug member and a valve stem extending from the plug member through the valve housing, an actuator stem being linearly translated by the rotary output through a conversion means, the actuator stem extending through the spring housing, the spring arranged to act directly upon the actuator stem.

* * * * *